United States Patent
Ogura et al.

(10) Patent No.: US 8,336,660 B2
(45) Date of Patent: Dec. 25, 2012

(54) SNOWMOBILE

(75) Inventors: Kotaro Ogura, Shizuoka (JP); Shinobu Amano, Shizuoka (JP); Masanori Yoshihara, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 446 days.

(21) Appl. No.: 12/630,926

(22) Filed: Dec. 4, 2009

(65) Prior Publication Data

US 2010/0140007 A1 Jun. 10, 2010

(30) Foreign Application Priority Data

Dec. 5, 2008 (JP) ................................. 2008-311334
Dec. 5, 2008 (JP) ................................. 2008-311335
Dec. 5, 2008 (JP) ................................. 2008-311336

(51) Int. Cl.
*B62M 27/02* (2006.01)
(52) U.S. Cl. ........................... 180/190; 180/182; 280/16
(58) Field of Classification Search ................. 180/190, 180/182, 191, 194, 184; 280/14.27, 14.28, 280/21.1, 22.1, 28, 900, 15–17
See application file for complete search history.

(56) References Cited

U.S. PATENT DOCUMENTS

| | | | | |
|---|---|---|---|---|
| 2,700,427 A * | 1/1955 | Schomers | ..................... | 180/182 |
| 3,583,507 A * | 6/1971 | Trautwein | ..................... | 180/190 |
| 4,796,902 A * | 1/1989 | Capra | ............................. | 280/16 |
| 5,518,080 A * | 5/1996 | Pertile | ............................. | 180/190 |
| 6,505,896 B1 * | 1/2003 | Boivin et al. | ................. | 305/178 |
| 6,626,258 B1 * | 9/2003 | Forbes | ............................. | 180/184 |
| 6,840,588 B2 * | 1/2005 | Deland et al. | ................. | 305/178 |
| 2005/0103547 A1 * | 5/2005 | Mallette et al. | .............. | 180/190 |
| 2006/0006737 A1 * | 1/2006 | Dandurand | ................... | 305/178 |
| 2007/0193801 A1 * | 8/2007 | Moji | ............................. | 180/190 |
| 2008/0029324 A1 * | 2/2008 | Plankenhorn | ................ | 180/190 |

FOREIGN PATENT DOCUMENTS

| | | |
|---|---|---|
| CA | 1332623 C | 10/1994 |
| CA | 2 498 588 A1 | 9/2005 |
| JP | 2005-254979 A | 9/2005 |

OTHER PUBLICATIONS

Official Communication issued in corresponding Canadian Patent Application No. 2,686,572, mailed on Jul. 25, 2011.
"Born Bikers", Motor Magazine Ltd., Spring 2003, p. 57.

* cited by examiner

*Primary Examiner* — Anne Marie M Boehler
(74) *Attorney, Agent, or Firm* — Keating & Bennett, LLP

(57) ABSTRACT

A snowmobile includes a vehicle body, a track belt, an engine, a left-and-right pair of skis, a suspension mechanism, and a steering mechanism. The track belt is located on a lower portion of the vehicle body. The engine drives the track belt. The suspension mechanism is a mechanism arranged to support the pair of skis so as to move in a vertical direction with respect to the vehicle body, and to support the pair of skis in an associated manner so that one of the skis moves downwards relative to the vehicle body when the other ski moves upwards relative to the vehicle body. The steering mechanism is a mechanism arranged to steer the pair of skis.

25 Claims, 21 Drawing Sheets

SNOWMOBILE

This application claims priority to Japanese Patent Application Nos. 2008-311334, 2008-311335, and 2008-311336 (filed Dec. 5, 2008), the disclosures of which are herein incorporated by reference in their entirety.

BACKGROUND OF THE INVENTION

1. Field of the Invention

The present invention relates to a snowmobile, specifically a snowmobile having a left-and-right pair of skis and a track belt for propulsion.

2. Description of the Related Art

A snowmobile typically includes a left-and-right pair of skis positioned at a front section of a vehicle body, a track belt for propulsion arranged to extend from a center to a rear section of the vehicle body, and a driving source such as an engine for driving the track belt (for example, see Japanese Laid-open Patent Application No. 2005-254979). The left and right skis are supported in a vertically movable manner by a vehicle body via a suspension mechanism that includes, for example, an arm member and a shock absorber. The left and right skis are steered via a steering mechanism including a handlebar and a steering column, a link rod or a similar component connected to the handlebar. The engine used as the driving source is accommodated in an engine compartment at a front section of the vehicle body. A crankshaft of the engine is connected to the track belt via, for example, a continuously variable transmission (CVT).

In such a snowmobile, the engine is driven, whereby the track belt is caused to rotate, and traction is generated between the track belt and snow surface, so that the snowmobile is propelled. Also, the rider can turn in a desired direction by using the handlebar to maneuver the left and right skis towards the direction of the turn.

SUMMARY OF THE INVENTION

The inventor of preferred embodiments of the present invention described and claimed in the present application conducted an extensive study and research regarding a snowmobile, such as the one described above, and in doing so, discovered and first recognized new unique challenges and previously unrecognized possibilities for improvements as described in greater detail below.

The suspension mechanism of a conventional snowmobile principally has a support leg having a lower end attached to the ski; an arm member having one end attached to the support leg and another end attached to the vehicle body; and a shock absorber having one end attached to the arm member and another end attached to the vehicle body.

During a turning maneuver, a snowmobile having a suspension mechanism with such a structure exhibits a behavior in which a load is disproportionately transmitted through the outer suspension mechanism and ski due to centrifugal force. Therefore, when diagonally descending a sloped surface covered by fresh snow, a rider drives the track belt in a state in which the snowmobile is steered towards the downhill direction of the sloped surface, as shown in FIGS. 21 and 22. As a result, a load is applied to an uphill ski, and the vehicle can be prevented from toppling in the downhill direction. By adjusting the driving force of the track belt while maintaining a state in which the snowmobile is steered in the downhill direction, the rider is able to keep the vehicle in balance. In FIG. 21, letter G indicates the sloped surface. In FIG. 22, arrow A1 indicates the slope direction of the sloped surface. In FIG. 22, the right side is the uphill side, and the left side is the downhill side. Also, in FIG. 22, arrow A2 shows the direction in which the vehicle is traveling.

However, when such a maneuver described above is performed, the snowmobile is unable to travel smoothly, and the fuel efficiency decreases.

In order to overcome the previously unrecognized and unsolved challenges described above, a preferred embodiment of the present invention provides a snowmobile capable of smooth travel on a sloped surface covered by fresh snow.

A snowmobile according to a preferred embodiment of the present invention includes a vehicle body having a seat on an upper portion, a track belt, a driving source, a left-and-right pair of skis, a suspension mechanism, and a steering mechanism. The track belt is located on a lower portion of the vehicle body. The driving source drives the track belt. The left-and-right pair of skis is located on a front section of the vehicle body. The suspension mechanism is a mechanism arranged to support the pair of skis so as to move in a vertical direction with respect to the vehicle body, and to support the pair of skis in an associated manner so that one of the skis moves downwards relative to the vehicle body when the other ski moves upwards relative to the vehicle body. The steering mechanism is a mechanism arranged to steer the pair of skis.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
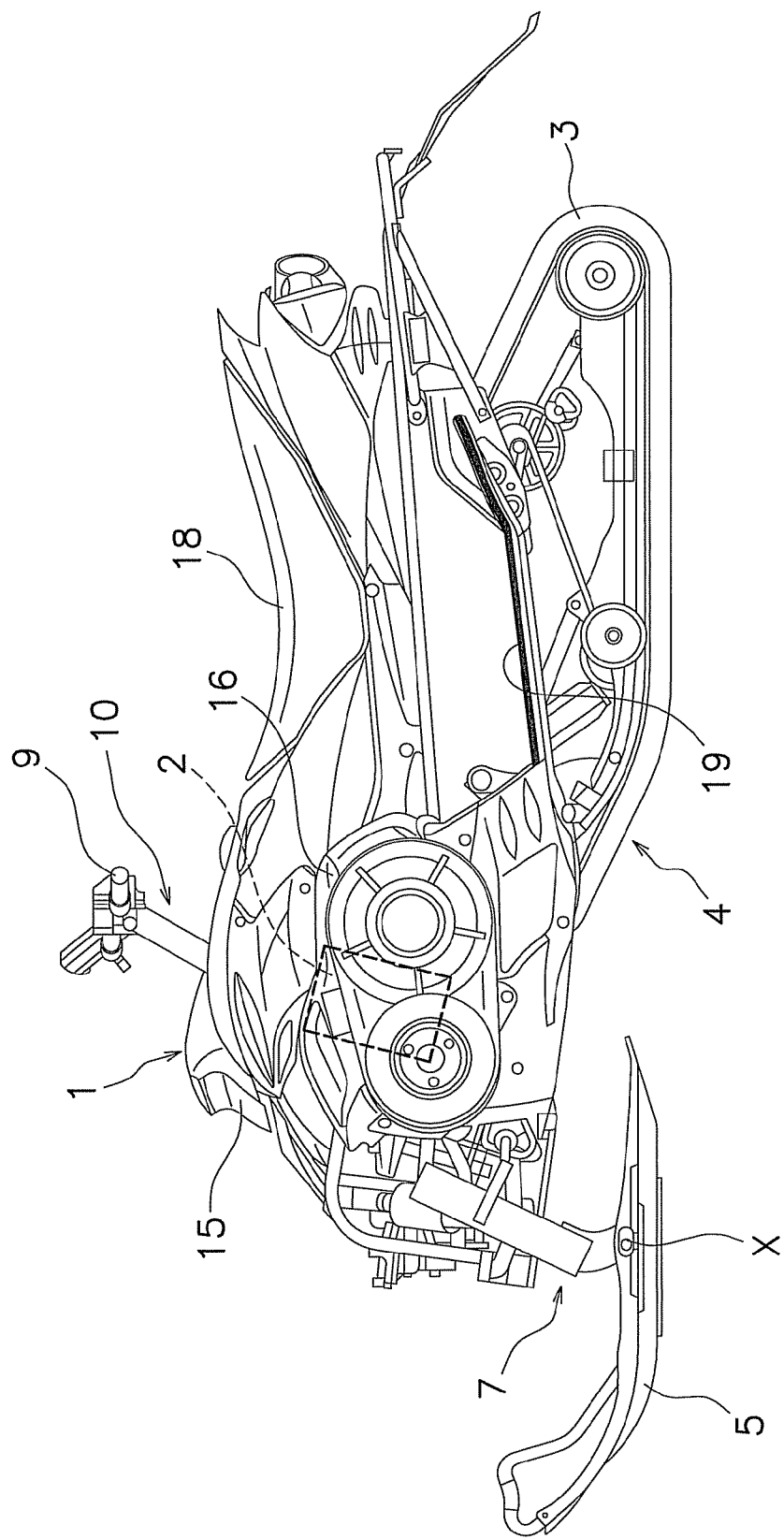
FIG. 1 is a left side view of a snowmobile according to a preferred embodiment of the present invention.
Figure 2:
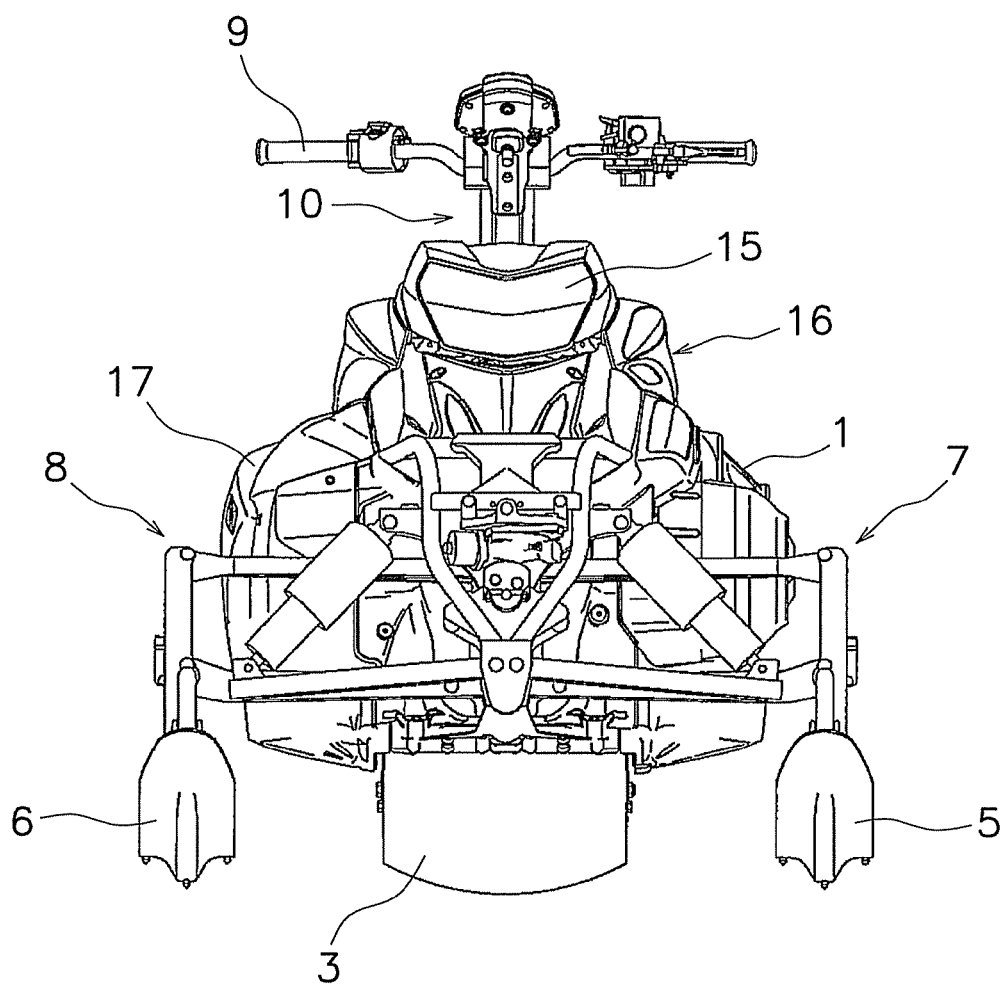
FIG. 2 is a front view of the snowmobile.
Figure 3:
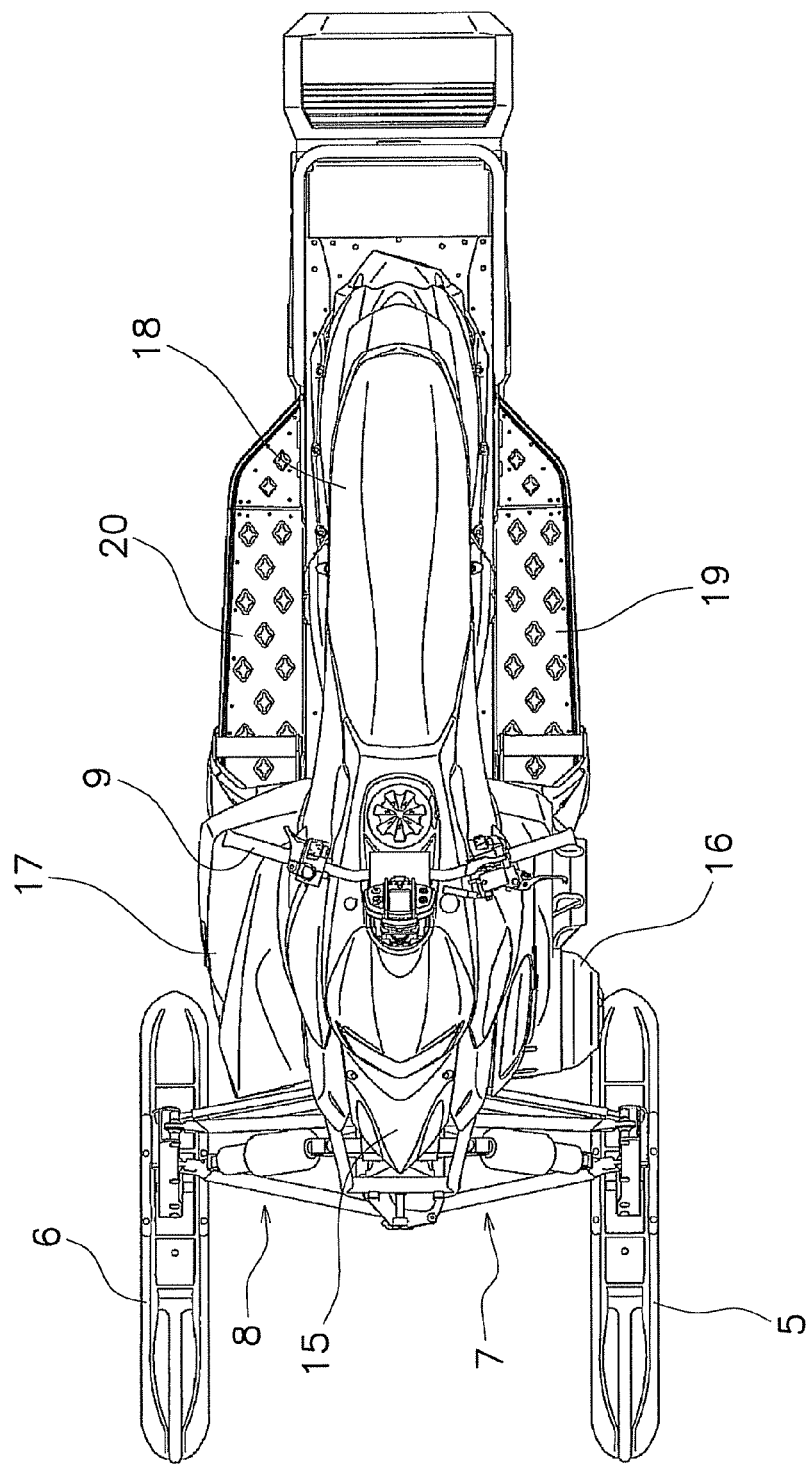
FIG. 3 is a plan view of the snowmobile.

FIGS. 1 through 3 show an exterior of a snowmobile according to a preferred embodiment of the present invention. The snowmobile preferably includes a vehicle body 1 having a frame, a cover, and other components; an engine 2 used as a driving source and positioned in an interior of the vehicle body 1; and a driving unit 4 including an endless track belt 3 driven by the engine 2. A pair of left-and-right skis 5, 6 is provided to the front section of the vehicle body 1, each of which skis being supported by the vehicle body 1 via left and right suspension mechanisms 7, 8 respectively. A steering mechanism 10 including a handlebar 9 is provided above the front section of the vehicle body 1.

The vehicle body 1 has a frame, a front cover 15 located to the front, and left and right side covers 16, 17 on the sides below the front cover 15. A seat 18 for accommodating a rider is positioned on an upper portion of the vehicle body 1. Between the seat 18 and the handlebar 9 and in the interior of the vehicle body 1, the engine 2 is installed on the frame as described above, and component members such as a fuel tank are disposed. Left and right foot-placement members 19, 20 are arranged spaced apart from each other below the seat 18. In other words, the snowmobile preferably is a saddle-riding type vehicle.

The driving unit 4 preferably includes a continuously variable transmission (CVT, not shown) connected to a crankshaft of the engine 2. The CVT is of a well-known structure, and includes a drive pulley, a driven pulley, and a belt threaded around the pulleys. A driven disc is attached to the driven pulley, and a driving wheel for propulsion is connected to the driven disc by a chain. The track belt 3 is wrapped around the driving wheel. The track belt 3 is described in detail further below.

Figure 4:
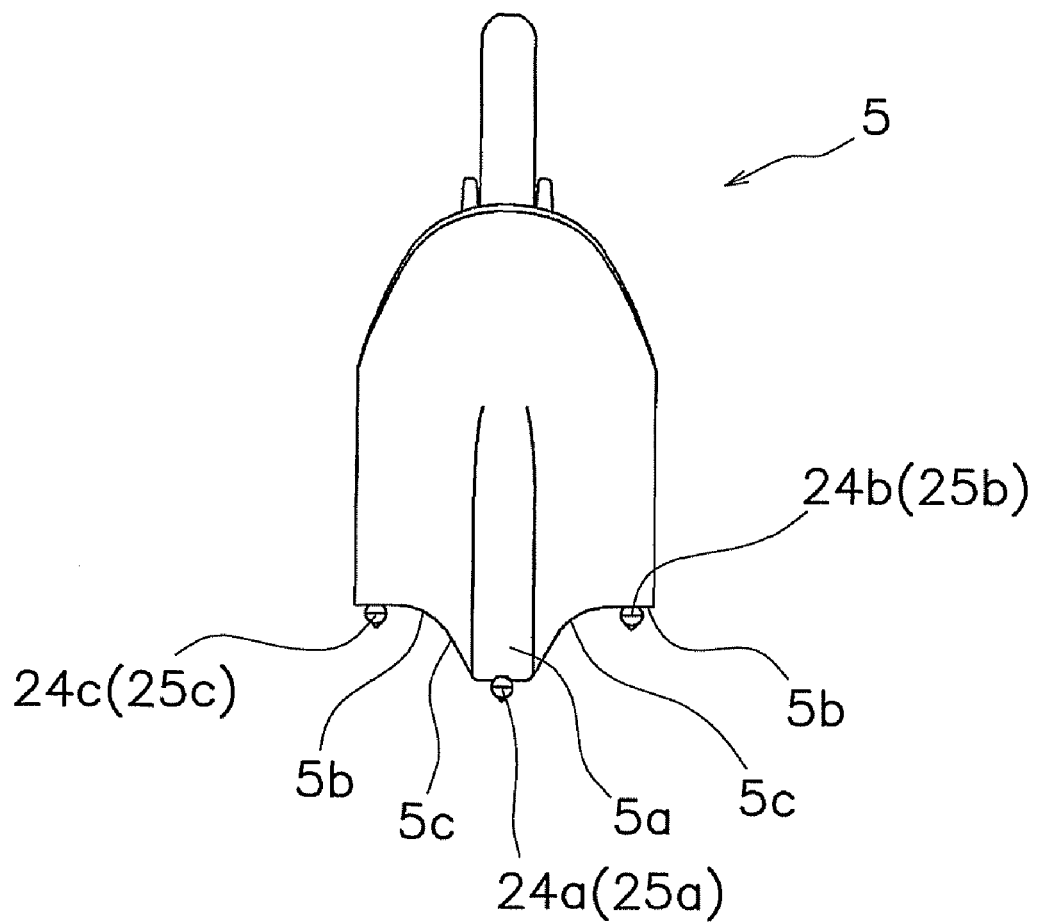
FIG. 4 is a front view of a ski attached to the snowmobile.
Figure 5:
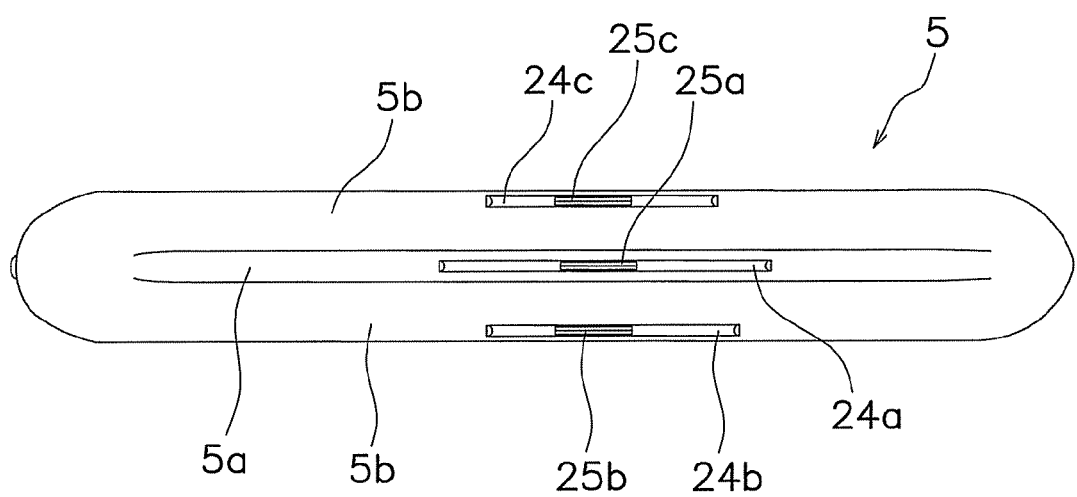
FIG. 5 is a bottom view of the ski.

The left and right skis 5, 6 have a similar configuration. One of the skis (ski 5) is shown in expanded view in FIGS. 4 and 5. FIG. 4 is a view of the ski from the front, and FIG. 5 is a view of the ski from below. The ski 5 has a downward-protruding keel 5a at a center in the width direction (i.e., the left-right direction, which is also the vehicle-width direction). In other words, the center portion having the keel 5a is at a lowermost position, and both end portions in the width direction are located higher than the keel 5a. The keel 5a, and the two widthwise end portions 5b, are flat surfaces having a predetermined width. A curved portion 5c is preferably provided between the keel 5a and the two widthwise end portions 5b. Runners 24a through 24c of predetermined length are fixed to the keel 5a and the two end portions 5b, following the lengthwise direction of the ski 5. The runner 24a fixed to the keel 5a is preferably longer than the runners 24b, 24c provided on either sides of the runner 24a. Tips 25a through 25c of predetermined length are fixed at a portion substantially central in the lengthwise direction of each of the runners 24a through 24c, respectively. The tips 25a through 25c are preferably formed of a cemented carbide and protrude downwards, for example.

Each of the left-and-right suspension mechanisms 7, 8 supports each of the corresponding skis 5, 6 respectively in a vertically movable manner relative to the vehicle body 1, and is provided to a front section of the vehicle body 1. Although a rear suspension mechanism is also provided to the driving unit 4 to which the track belt 3 is provided, the configuration of the rear suspension mechanism is preferably similar to conventional configurations, and a description is therefore omitted.

Since the left and right suspension mechanisms 7, 8 are preferably configured so as to be bilaterally symmetrical, members that are common to both suspension members 7, 8 will be described in relation to only one of the suspension mechanisms (suspension mechanism 7), and are indicated using identical numerals for both mechanisms.

Figure 6:
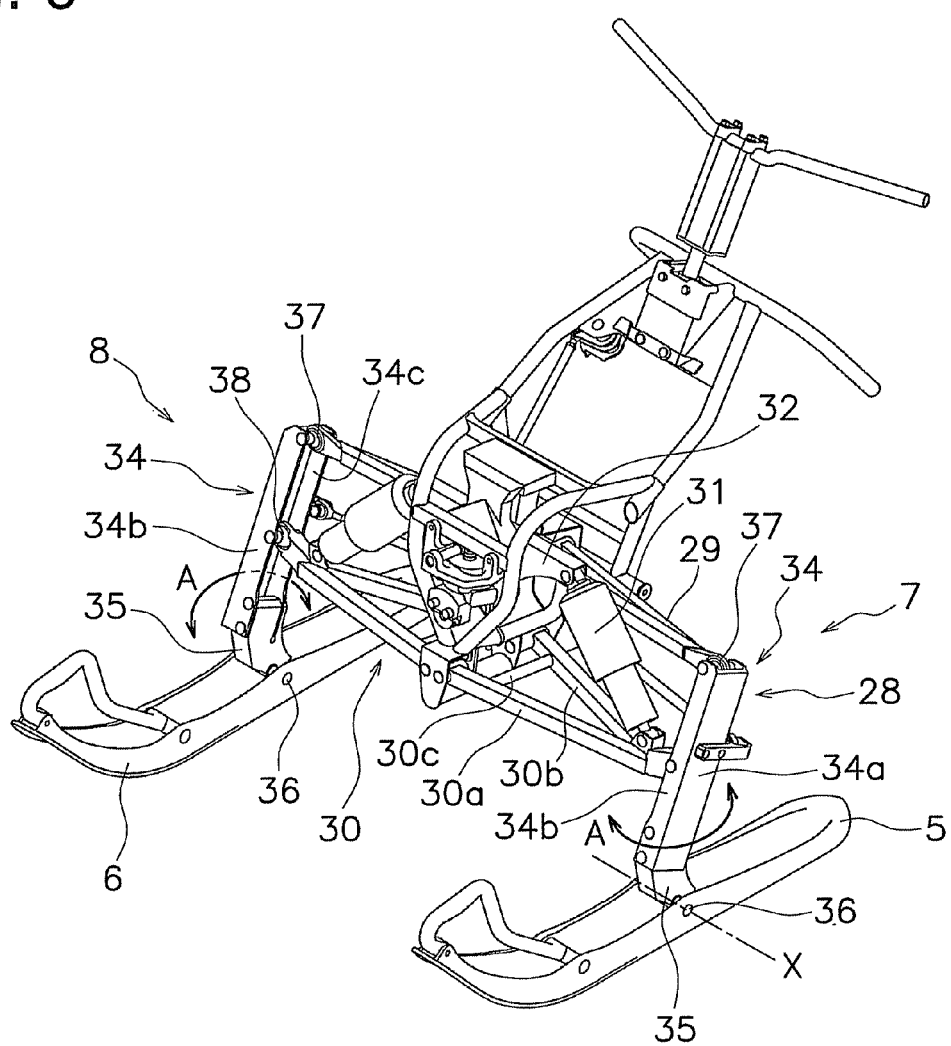
FIG. 6 is an exterior perspective view of a suspension mechanism.

FIG. 6 shows a section relating to the suspension mechanism. The suspension mechanism 7 preferably is of a double wishbone type, and preferably includes a connecting member 28, an upper arm 29, a lower arm 30, a shock absorber 31, and a swinging member 32 that is shared by the two suspension mechanisms 7, 8. Each of the members, with the exception of the swinging member 32, is provided to the other suspension mechanism 8 using an entirely similar layout.

The connecting member 28 has a main body member 34, with a C-shaped cross-section having an opening towards the inner side of the vehicle body, and a mounting member 35 fixed to a lower end of the main body member 34. The main body member 34 is preferably formed from an aluminum extrudate member and is disposed at an incline so that a lower portion inclines in the forward direction of the vehicle. The main body member 34 includes a first surface 34a disposed outwardly with respect to the vehicle-width direction and perpendicularly or substantially perpendicularly with respect to the vehicle-width direction, as well as a second and a third surface 34b, 34c extending towards the vehicle body 1 from each of respective front and rear edges of the first surface 34a (the third surface 34c is shown on the other suspension mechanism 8). The second surface 34b and the third surface 34c are parallel or substantially parallel to each other, and are also parallel or substantially parallel with a swing axis X (described further below) of the skis 5, 6. In contrast to the main body member 34, the mounting member 35 is disposed so that a lower portion is located further towards the rear direction of the vehicle than an upper portion, and a through-hole penetrating in the vehicle-width direction is formed at a lower end section of the mounting member 35. Both ends of a pin 36 penetrating the through-hole are fixed to the ski 5, and the ski 5 is thereby capable of swinging about an axial core (swing axis X).

The upper arm 29 and the lower arm 30 each preferably includes a V-shaped member whose open side is closer to the vehicle body 1 side (inner side) and whose joined side is further away from the vehicle body 1 (outer side). An inner end portion of each of the arms 29, 30 is attached on the frame of the vehicle body 1 so as to be capable of pivoting about an axis in the longitudinal direction of the vehicle body. An outer end portion of the upper arm 29 is supported by an upper end portion of the connecting member 28 via a spherical bearing 37, and an outer end portion of the lower arm 30 is supported by a portion substantially central in the vertical direction of the connecting member 28 via a spherical bearing 38.

The upper arm 29 has a smaller inner opening angle than a regular double-wishbone-type upper arm, and is disposed rearward of the shock absorber 31 with respect to the vehicle body. The shape and position of the upper arm 29 leaves a space for disposing other members in an upper portion of the suspension mechanism 7 towards the front with respect to the vehicle body. Meanwhile, the opening angle of an inner portion of the lower arm 30 is larger than that of the upper arm 29, and a reinforcing arm 30c arranged to connect two members 30a, 30b is provided to the inner portion. The shock absorber 31 is located in between the two members 30a, 30b of the lower arm 30 as viewed from above.

Figure 7:
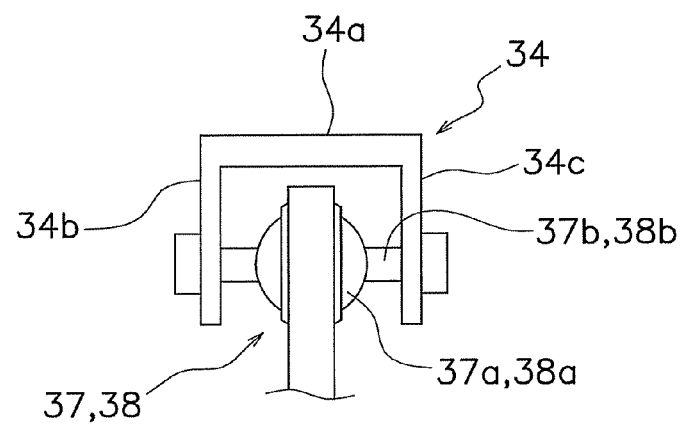
FIG. 7 is an exterior view of a spherical bearing provided to the suspension mechanism.

As shown in FIG. 7, spherical bearings 37, 38 include spherical bearing bodies 37a, 38a and mounting shafts 37b, 38b that extend in the longitudinal direction of the vehicle body from the spherical bearing bodies 37a, 38a. The mounting shafts 37b, 38b are fixed to the second surface 34b and the third surface 34c of the main body 34 of the connecting member 28.

The outer end of each of the upper arm 29 and the lower arm 30 are thus attached to the connecting member 28 via the spherical bearings 37, 38 respectively, and the mounting members 37b, 38b of the spherical bearings 37, 38 are thus attached to the connecting member 28 so that the mounting members 37b, 38b are disposed along the longitudinal direction of the vehicle body. As a result, the connecting member 28 is thereby capable of rotating in the direction of arrow A in FIG. 6, and each of the arms 29, 30 can move freely in the vertical direction. Specifically, the connecting member 28 preferably has a C-shape in cross section that opens in the direction facing the vehicle body 1. As a result, the vertical stroke of each of the arms 29, 30 is not restricted, and the stroke of the suspension mechanisms 7, 8 is able to be increased.

A lower end of the shock absorber 31 is connected to an outer end of the lower arm 30, and an upper end of the shock absorber 31 is connected to the swinging member 32. Each of the connecting sections is connected by a pin extending in the longitudinal direction of the vehicle body, thereby allowing upper and lower connecting end sections of the shock absorber 31 to rotate about an axial core of the pin.

Figure 8:
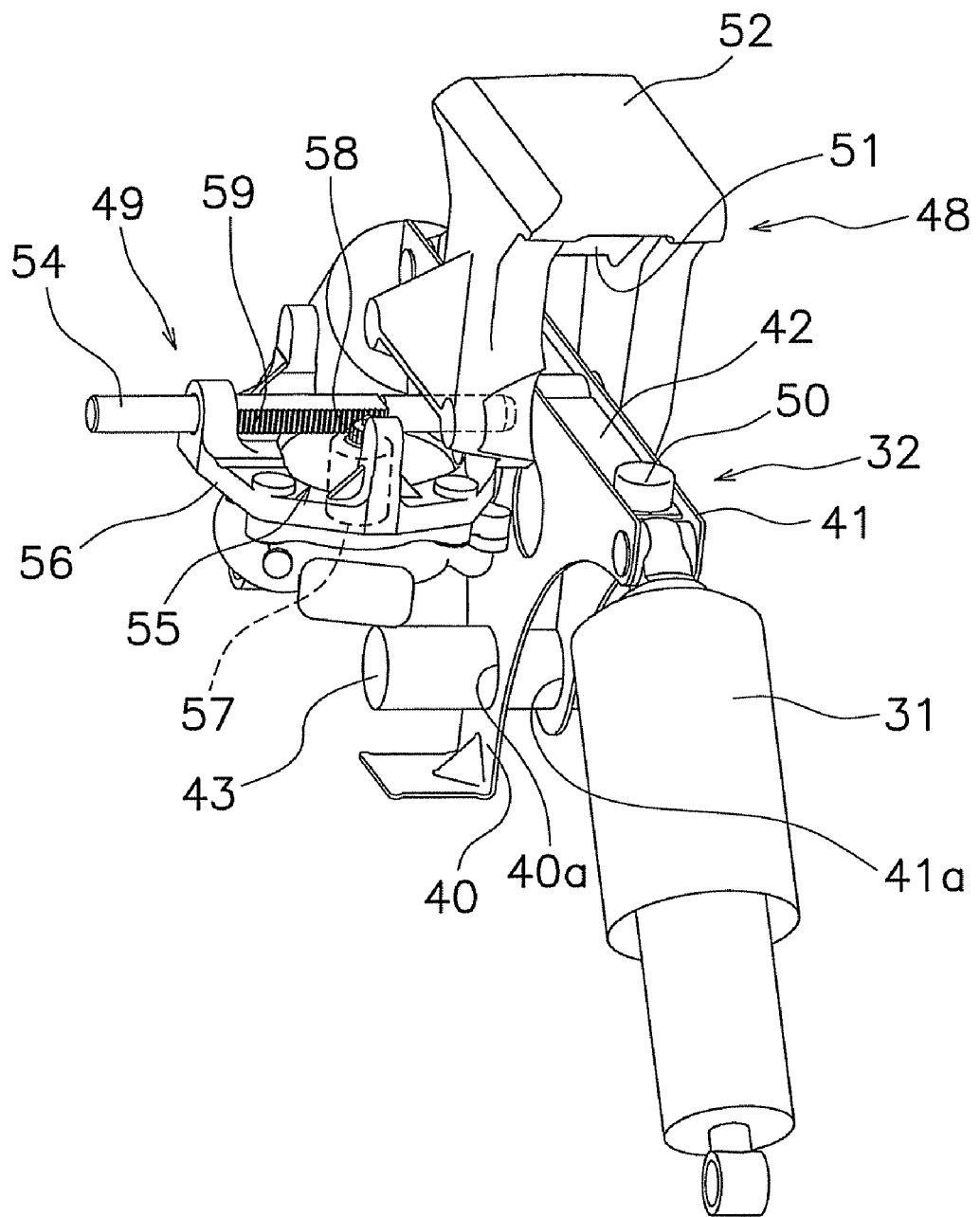
FIG. 8 is a drawing showing a swinging member, a tilt-locking mechanism (in an unlocked state), and a tilt-stopper mechanism of the suspension mechanism.

As shown in expanded view in FIG. 8, the swinging member 32 preferably includes front and rear plates 40, 41 arranged substantially as an inverted triangle and separated from each other by a gap and an upper plate 42 linking upper portions of the plates 40, 41. FIG. 8 shows the swinging member 32 and related component parts in isolation from other component parts. A hole 40a, 41a is formed in the same location on a lower end portion of each of the front and rear plates 40, 41, and a rod 43 passes through the holes 40a, 41a. The rod 43 extends in the longitudinal direction of the vehicle body, a rear end of the rod 43 being fixed to the frame of the vehicle body 1. The upper portion of the swinging member 32 is thereby capable of swinging in the left-right direction (vehicle-width direction), with the rod 43 as the fulcrum. The rod 43 is located at substantially a center in the vertical direction of the respective points where the upper arm 29 and lower arm 30 connect with the vehicle body 1. The upper end of each of the shock absorbers 31 is inserted between, and pivotably attached to, the front and rear plates 40, 41 respectively near each of two vertices at an upper portion of the inverted triangle in the swinging member 32.

As described above, the opening angle of the upper arm 29 is relatively small, and a space is made available towards the front; an upper portion of the shock absorber 31, as well as the swinging member 32 to which the shock absorber 31 is connected, are located in the space in front of the upper arm 29.

Figure 10:
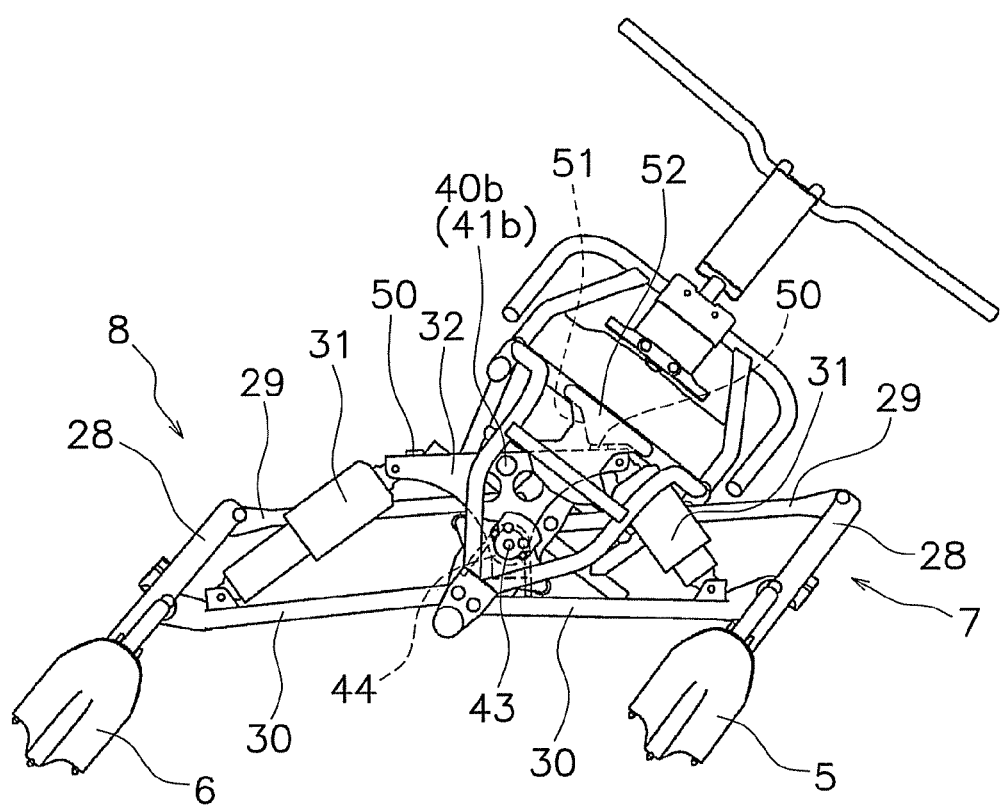
FIG. 10 is a drawing showing a state in which tilting of a vehicle body is at a maximum.

As described above, in the suspension mechanisms 7, 8 according to the present preferred embodiment, an upper end portion of the shock absorber 31 is attached to the swinging member 32, and not directly attached to the vehicle body 1. The swinging member 32, to which the upper end of each of the left and right shock absorbers 31 is attached, is capable of swinging in the left-right direction relative to the vehicle body 1. As a result, the left and right skis 5, 6 move in a cooperative manner so that when, for example during a left turn or a similar maneuver, the left skis 5 moves upwards relative to the vehicle body 1, the right ski 6 moves downwards relative to the vehicle body 1, as shown in FIG. 10. The vehicle body 1 can be thereby tilted with ease.

Even in a state where the tilting of the vehicle body 1 is at a maximum (FIG. 10), the swing pivot (rod 43) of the swinging member 32 is positioned lower than a point where the upper arm 29 and the lower arm 30 connect with the vehicle body 1 (i.e., an upper end of the suspension mechanism).

As shown by a dashed line in FIG. 10, a torsion spring 44 is provided around the rod 43. When the vehicle body 1 is in a tilting state such as that shown in FIG. 10, one end of the torsion spring 44 is locked onto the swinging member 32, and the other end is locked onto the frame of the vehicle body 1. The torsion spring 44 biases the vehicle body 1 and the swinging member 32 so that the vehicle body 1 assumes an upright orientation (also described as a "neutral position" hereafter) shown in FIG. 2. In other words, the torsion spring 44 applies a repulsive force against the tilting of the vehicle body 1, and can be made to assume a function of a tilt-restoring member.

As described above, the suspension mechanisms 7, 8 according to the present preferred embodiment allow tilting of the vehicle body 1. However, when the vehicle body 1 is allowed to tilt excessively, a problem occurs in that, for example, a foot-placement member 19, 20 or an element or portion of the vehicle body 1 may contact the snow surface. Moreover, it is preferable in terms of convenience to prevent the vehicle body 1 from tilting while the snowmobile is parked or during mounting and dismounting. Accordingly, there are provided a tilt-stopper mechanism 48 arranged to restrict the tilting of the vehicle body 1 to within a predetermined angle and a tilt-locking mechanism 49 arranged to prevent the tilting.

Figure 9:
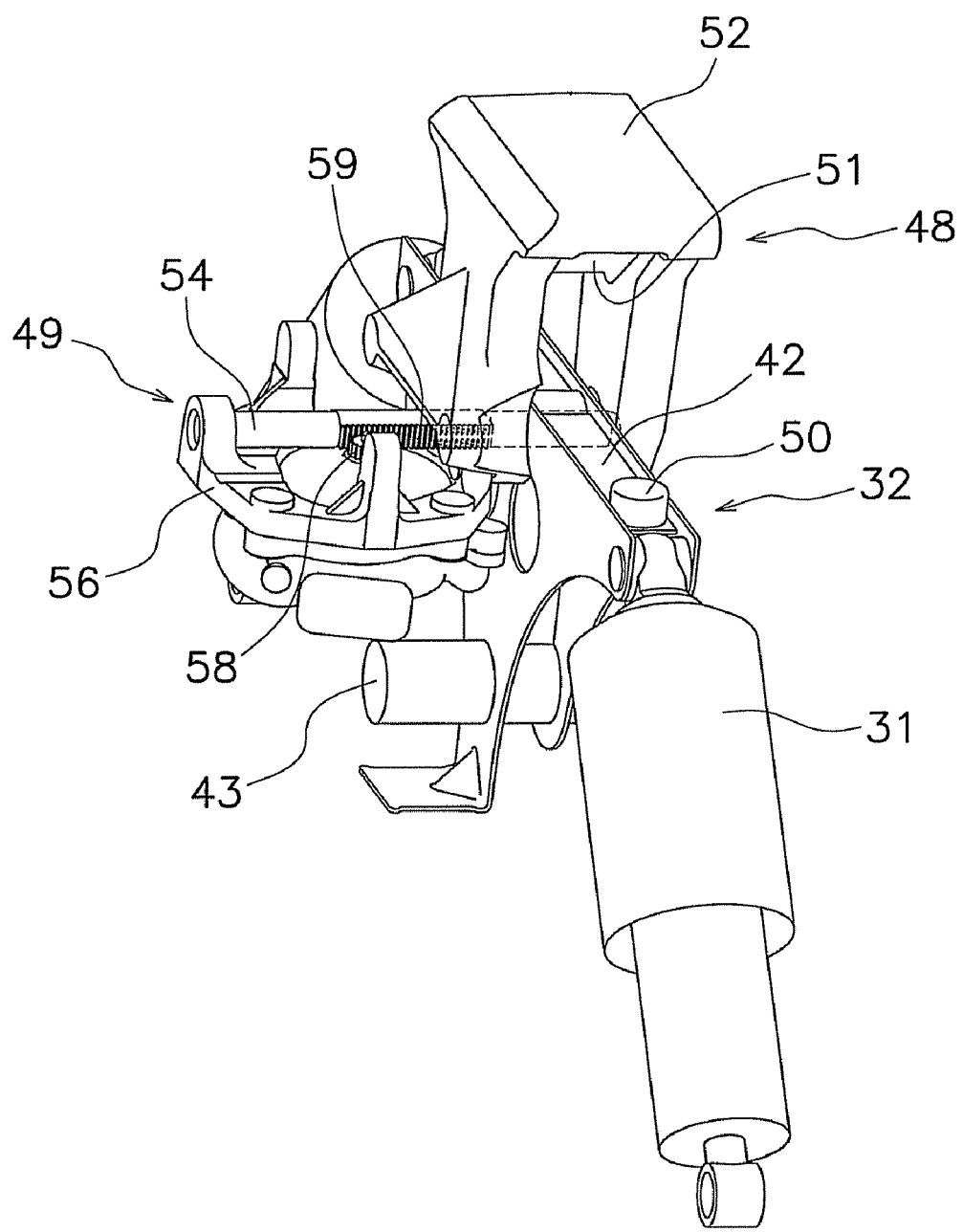
FIG. 9 is a drawing showing the swinging member, the tilt-locking mechanism (in a locked state), and the tilt stopper mechanism of the suspension mechanism.

As shown in FIGS. 8 through 10, the tilt-stopper mechanism 48 preferably includes a plastic stopper block 50 provided to the swinging member 32, and a contact member 51 provided on the vehicle body 1. The stopper block 50 is fixed to each of left and right end portions of an upper surface of the upper plate 42 defining a portion or element of the swinging member 32. The contact member 51 is arranged on a contact block 52 at a center portion in the width direction of the vehicle body 1. Specifically, the contact block 52 preferably has an inverse U-shape in side view, and the contact member 51 preferably has an inverted triangular shape in front view on an interior surface of an upper portion of the contact block 52. The swinging member 32 is located inside the contact block 52.

Accordingly, as shown in FIG. 10, when the vehicle body 1 tilts and the swinging member 32 swings relative to the vehicle body 1, the stopper block 50 fixed to the upper portion of the swinging member 32 contacts the contact member 51, and the swinging of the swinging member 32 is restricted. In other words, the tilting of the vehicle body 1 is restricted.

As shown in FIGS. 8 and 9, the tilt-locking mechanism 49 preferably includes a rod 54 extending in the longitudinal direction of the vehicle body, a driving mechanism 55 arranged to drive the rod 54, and a hole 40b, 41b (shown in FIG. 10) formed on each of the front and rear plates 40, 41 forming an element or portion of the swinging member 32. The rod 54 is supported on a base member 56, provided to the vehicle body 1, so as to be capable of advancing and retracting in the longitudinal direction of the vehicle body. The rod 54 assumes an unlocked position (in which the rod 54 has moved forwards) shown in FIG. 8 or a locked position (in which the rod 54 has moved rearwards) shown in FIG. 9. The driving mechanism 55 preferably includes a motor 57 provided to a lower portion of the base member 56, a pinion gear 58 turned by the motor 57, and a rack 59 disposed on the rod 54 and engaging with the pinion gear 58. Each of the holes 40b, 41b is formed at a position such that the rod 54 is capable of penetrating each of the holes 40b, 41b when the vehicle body 1 is at the non-tilting, neutral position (upright orientation). The motor 57 can be made to rotate in a forward or a reverse direction by operating a lock button (not shown) provided to the handlebar 9.

According to the configuration described above, when the driving mechanism 55 moves the rod 54 rearwards with respect to the vehicle body in a state where the vehicle body 1 is in the neutral position, the rod 54 enters each of the holes 40b, 41b formed on the swinging member 32 and moves to the locked position, and the swinging member 32 is prevented from swinging. In other words, the vehicle body 1 is locked against tilting.

When the snowmobile is parked and not subject to an external force, the vehicle body 1 is biased towards assuming the neutral position by the tilt-restoring function of the torsion spring 44 as described above. The torsion spring 44 may be configured to have a large biasing force so that the vehicle body 1 assumes the neutral position. Therefore, the rod 54 is normally able to be moved smoothly into the locked position. However, there may be an instance in which the vehicle body 1 inexplicably tilts and fails to return to the neutral position even when the snowmobile is parked. In such an instance, where the vehicle body 1 does not return to the neutral position, there will be misalignment between the position to which the rod 54 is provided and the position of each of the holes 40b, 41b formed on the swinging member 32. During such a state; i.e., a state in which the rod 54 collides with the plate 40 of the swinging member 32 and fails to move, causing the motor 57 to rotate may cause a malfunction of the motor 57 or another component.

Therefore, a mechanism for absorbing the rotational force of the motor 57 is provided to the tilt-locking mechanism 49. Specifically, a spring (not shown) arranged to transmit the rotation of the motor 57 to the pinion gear 58 is provided between the motor 57 and the pinion gear 58. In an instance where the pinion gear 58 is inexplicably unable to rotate even though the motor 57 is rotating, the spring contracts and thereby absorbs the rotation of the motor 57. In other words, in an instance where the position of the rod 54 and the position of each of the holes 40b, 41b do not align, the spring compresses, and thereby initially absorbs the rotational force of the motor 57. Then, when the vehicle body 1 returns to the neutral position and the position of the rod 54 and the position of each of the holes 40b, 41b are aligned, a force stored in the spring moves the rod 54 to the locked position and into each of the holes 40b, 41b.

Figure 11:
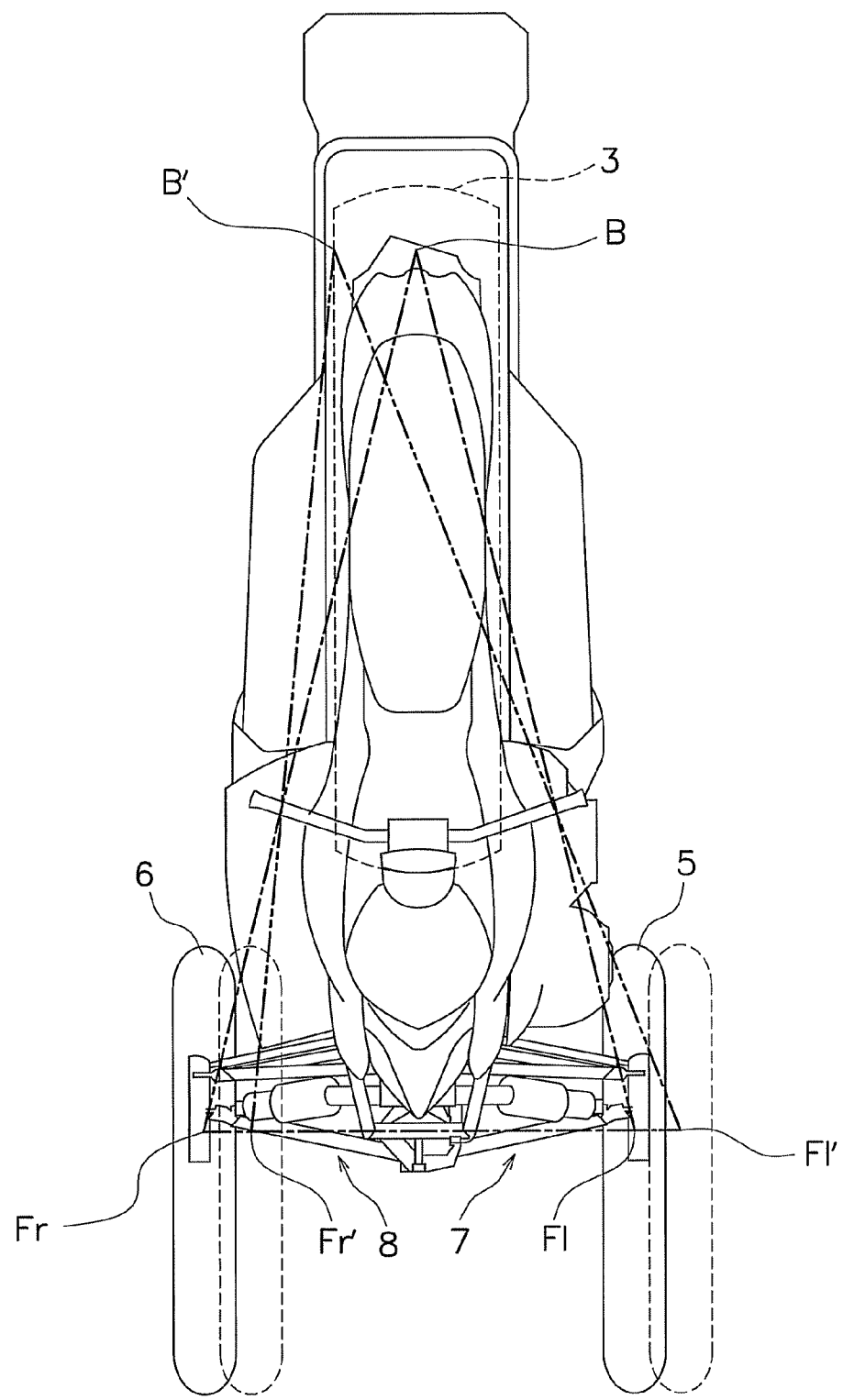
FIG. 11 is a drawing showing a relationship between the snowmobile and a center of gravity.

The tilt-stopper mechanism 48 or the tilt-locking mechanism 49 described above define a self-supporting device for keeping the vehicle body 1 from tilting so that a center of gravity of the vehicle does not fall outside a predetermined region. More specifically, the fact that the tilt-stopper mechanism 48 and the tilt-locking mechanism 49 keep the vehicle body 1 from tilting allows the center of gravity of the vehicle to be contained within the triangular region defined by linking a rear end B of a ground-contacting portion of the track belt 3 with ground-contacting points Fl, Fr of the left and right skis 5, 6, respectively (planar projection of respective points of connection between each of the skis 5, 6 and each of the suspension mechanisms 7, 8), as shown in FIG. 11.

Each of B, Fl, Fr indicates a point when the vehicle body 1 is in the neutral position, but the points when the vehicle body 1 is tilting are similarly depicted. For example, when the vehicle body 1 tilts to the right, the rear end of the ground-contacting portion of the track belt 3 moves towards the turn direction to point B' in FIG. 11, the ski 5 on the outside of the turn direction moves away from the vehicle body 1 to point Fl', and the ski 6 on the inside of the turn direction moves towards the vehicle body 1 to point Fr'. Even in such instances, the center of gravity of the vehicle is contained within the triangular region defined by linking the rear end B' of the ground-contacting portion of the track belt 3 with each of respective ground-contacting points Fl', Fr' of the left and right skis 5, 6.

Figure 12:
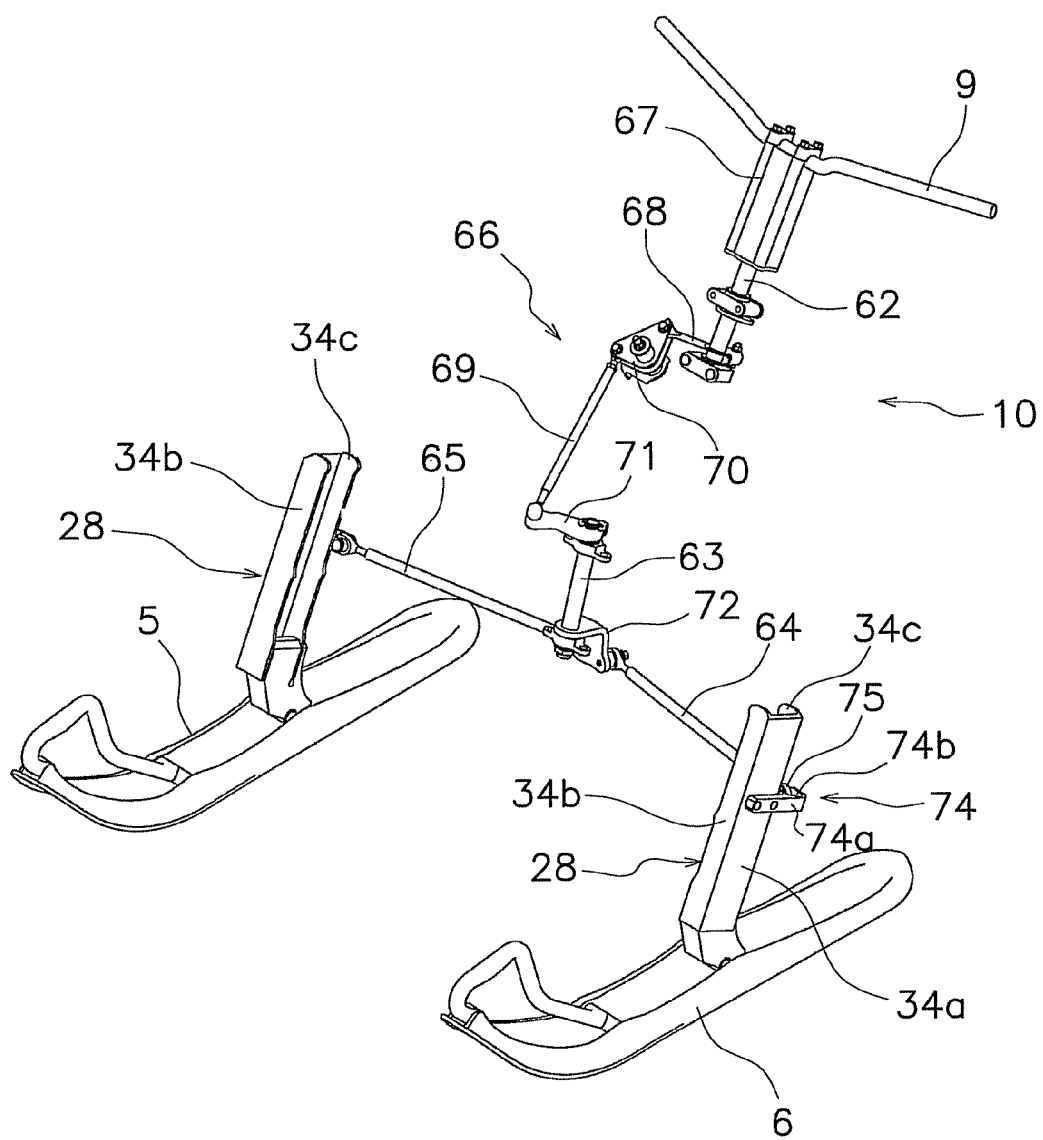
FIG. 12 is an exterior perspective view showing a steering mechanism.

FIG. 12 shows the steering mechanism 10. The steering mechanism 10 preferably includes the handlebar 9; upper and lower support shafts 62, 63; a pair of tie rods 64, 65; a link mechanism 66 arranged to transmit a movement of the handlebar 9 to the pair of tie rods 64, 65; and the pair of connecting members 28, each of which is connected to each of the tie rods 64, 65 respectively. Each of the two connecting members 28 define a portion or element of each of the two suspension mechanisms 7, 8 respectively, as described previously. However, the two connecting members 28 are also members defining a portion or element of the steering mechanism 10.

The handlebar 9 is secured to an upper portion of a supporting member 67 that is capable of pivoting relative to the vehicle body 1. The upper support shaft 62 is fixed on a lower end of the supporting member 67 and extends downwards.

The link mechanism 66 is a mechanism arranged to transmit the rotation of the upper support shaft 62 to the lower support shaft 63, and includes a first rod 68; a second rod 69; a rotating member 70 arranged to link and rotate the two rods 68, 69; and an arm 71. One end of the first rod 68 is rotatably connected to a lower end of the upper support shaft 62, and the other end of the first rod 68 is rotatably connected to the rotating member 70. One end of the second rod 69 is rotatably connected to the rotating member 70, and the other end is rotatably connected to a distal end of the arm 71. The rotating member 70 is rotatably supported by a section of the vehicle body 1. A base end of the arm 71 is fixed to an upper end of the lower support shaft 63.

The lower support shaft 63 is provided so as to extend in the vertical direction, a lower end of which being fixed onto an L-shaped bracket 72. One end of each of the left and right tie rods 64, 65 is pivotably connected to the L-shaped bracket 72.

The other end of each of the left and right tie rods 64, 65 is connected to each of the left and right connecting member 28, respectively. Specifically, a mounting member 74 is fixed to the connecting member 28 at substantially the middle portion in the vertical direction. The mounting member 74 preferably is L-shaped, and includes a first mounting portion 74a extending in the longitudinal direction of the vehicle body, and a second mounting portion 74b extending towards the inner direction in the vehicle-width direction from a rear end of the first mounting portion 74a. The first mounting portion 74a is fixed to the first surface 34a of the connecting member 28. The second mounting portion 74b is disposed so as to form a gap between a rear surface of the third surface 34c of the connecting member 28, and the other end of the tie rod 64, 65 is supported by a spherical bearing 75 within the gap. A mounting shaft of the spherical bearing 75 extends in the longitudinal direction of the vehicle body 1, similarly to the mounting shafts of the spherical bearings 37, 38 each supporting each of the arms 29, 30 to the connecting member 28 respectively (see FIG. 7).

Figure 13:
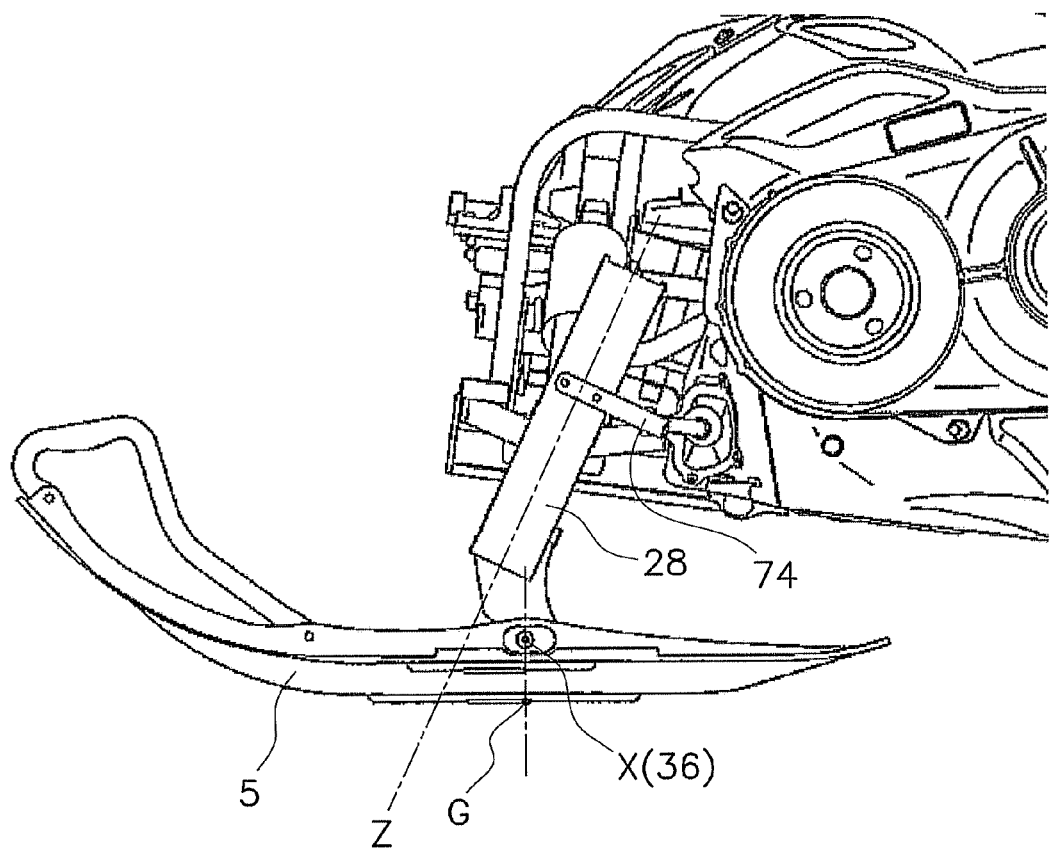
FIG. 13 is a drawing showing a relationship between a steering axis, a swing axis of the ski, and a ground-contacting portion of the ski.

In such a steering mechanism 10, a steering axis is defined by a line Z linking respective centers of spherical bearings 37, 38 each supporting respectively an outer end portion of the upper arm 29 and an outer end portion of the lower arm 30 of each of the left and right connecting members 28, as shown in FIG. 13. The steering axis Z passes further frontward of a swing axis X (axial core of the pin 36), which is a point of connection between each of the skis 5, 6 and the connecting member 28, as shown in FIG. 13. In other words, the steering axis Z is located further frontward of a ground-contacting point G that is a planar projection of the point of connection between each of the skis 5, 6 and the connecting member 28 (swing axis X).

Figure 14:
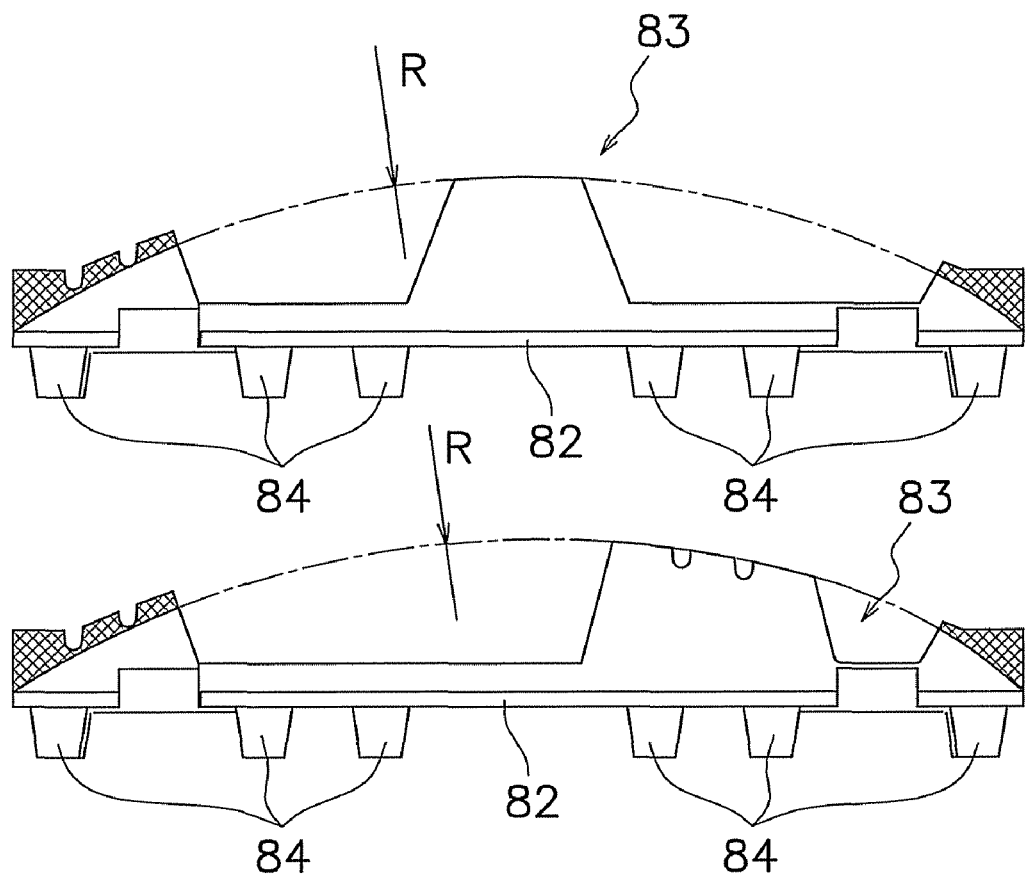
FIG. 14 is a drawing showing a paddle of a track belt.

As described above, the track belt 3 is wrapped around the driving wheel of the driving unit 4. As shown in FIG. 14, the track belt 3 preferably includes an annular belt base portion 82; a plurality of outwardly protruding paddles 83 formed on the belt base portion 82; and a plurality of locking pieces 84 arranged to perform driving, disposed on an inside of the belt base portion 82. Each of the paddles 83 is arranged so as to extend in the belt-width direction (vehicle-width direction), the paddles being formed at a predetermined interval in the direction of belt circulation.

Figure 15:
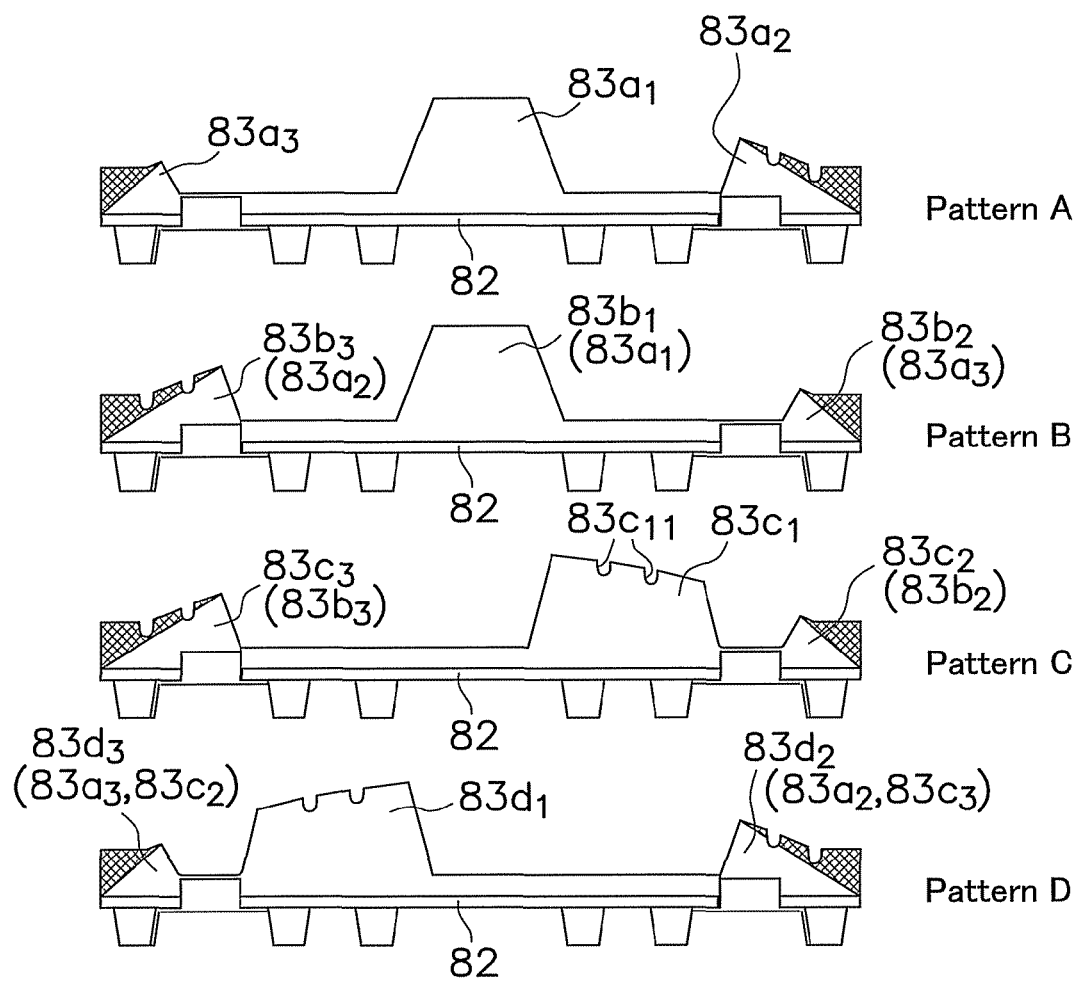
FIG. 15 is a drawing showing patterns on the paddle.

FIG. 14 shows two typical preferred embodiments of the paddles 83. Each of the paddles 83 preferably includes a plurality of protrusions arranged in a row along the belt-width direction, and preferably includes four types of patterns as shown in FIG. 15, for example.

Specifically, a paddle having a pattern A ("paddle A" hereafter) has a first protrusion $83a_1$ located in a central portion in the belt-width direction, a second protrusion $83a_2$ located at one end in the belt-width direction, and a third protrusion $83a_3$ located at the other end. The first protrusion $83a_1$ is preferably a trapezoid, and is the tallest of the three protrusions, for example. The second protrusion $83a_2$ is preferably a triangle, the height of which decreasing towards a side portion (end portion in the belt-width direction), and the highest portion of which being lower than a ground-contacting portion of the first protrusion $83a_1$ (upper edge portion of the trapezoid), for example. The height of the third protrusion $83a_3$ decreases towards a side portion (end portion in the belt-width direction) similarly to the second protrusion $83a_2$, the highest portion being lower than a top vertex portion of the second protrusion $83a_2$, for example.

A paddle having a pattern B ("paddle B" hereafter) preferably includes a first, a second, and a third protrusion $83b_1$ through $83b_3$, and is preferably arranged to be bilaterally symmetrical to the paddle A. In other words, the first protrusion $83b_1$ of the paddle B preferably has a form that is identical to that of the first protrusion $83a_1$ of the paddle A; the second protrusion $83b_2$ of the paddle B preferably has a form that is bilaterally symmetrical to that of the third protrusion $83a_3$ of the paddle A, and the third protrusion $83b_3$ of the paddle B preferably has a form that is bilaterally symmetrical to that of the second protrusion $83a_2$ of the paddle A.

A paddle having a pattern C ("paddle C" hereafter) preferably includes a first, a second, and a third protrusion $83c_1$ through $83c_3$. The paddle C preferably includes second and third protrusions that are identical in position and form to those of the paddle B, while including a protrusion corresponding to the first protrusion that differs from that of the paddle B. Specifically, each of the second protrusion $83c_2$ and the third protrusion $83c_3$ of the paddle C preferably has an identical form to each of the second protrusion $83b_2$ and the third protrusion $83b_3$ of the paddle B, respectively. On the paddle C, no protrusion is provided at central portion in the belt-width direction, and the first protrusion $83c_1$ is located further towards one end, for example. Specifically, the first protrusion $83c_1$ of the paddle C is preferably positioned between the center in the belt-width direction and the second protrusion $83c_2$ provided towards one end, and is substantially trapezoid-shaped, the height of an upper edge portion of the first protrusion $83c_1$ decreasing towards the side portion, for example. Nevertheless, a lowermost portion of the upper edge portion of the first protrusion $83c_1$ is higher than a highest portion of the second protrusion $83c_2$. Two notches $83c_{11}$ are preferably formed on the upper edge portion (distal-end periphery portion extending in the belt-width direction) of the first protrusion $83c_1$.

A paddle having a pattern D ("paddle D" hereafter) preferably includes a first, a second, and a third protrusion $83d_1$ through $83d_3$ and is preferably arranged so as to be bilaterally symmetrical to the paddle C. In other words, the first protrusion $83d_1$ of the paddle D preferably has a bilaterally symmetrical form to that of the first protrusion $83c_1$ of the paddle C; the second protrusion $83d_2$ of the paddle D preferably has a bilaterally symmetrical form to that of the third protrusion $83c_3$ of the paddle C (and an identical form to that of the second protrusion $83a_2$ of the paddle A), and the third protrusion $83d_3$ of the paddle D preferably has a bilaterally symmetrical form to that of the second protrusion $83c_2$ of the paddle C (and an identical form to that of the third protrusion $83a_3$ of the paddle A).

A center portion of each of the paddles having any of the patterns is higher than a side portion. More accurately, a cross section of each of the paddles in a direction perpendicular or substantially perpendicular to a direction of belt circulation and a frictional sliding surface of the belt is of such a form that the height from the frictional sliding surface is greater at a center portion than at a side portion. In other words, a cross section of each of the paddles in a direction perpendicular or substantially perpendicular to a direction of belt circulation is of such a form that the center portion of a ground-contacting surface is convex. A line joining each respective periphery portion (i.e., tip periphery portion extending in the belt-width direction) of each protrusion defining a paddle preferably has a form of an arc having a predetermined radius R, the center portion of a ground-contacting side bulging downwards (upwards in FIG. 14) describing a mound shape as shown in FIG. 14.

Within each protrusion on each of the paddles, each portion shaded with diagonal lines is a portion whose thickness (i.e., length in the direction of belt circulation) is smaller than that of an unshaded portion and gradually decreases near a distal end.

Figure 16:
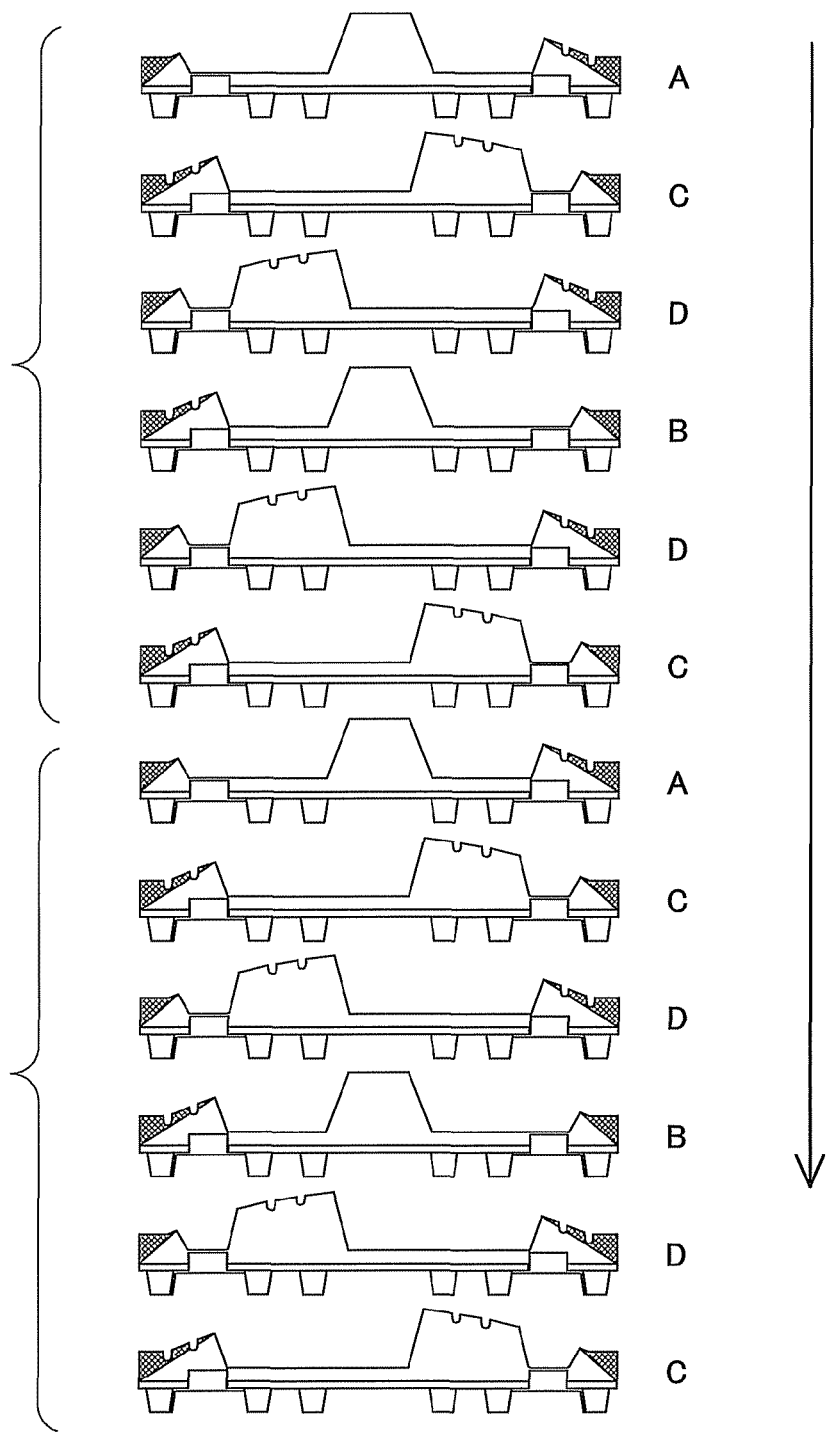
FIG. 16 is a drawing showing a sequence in which the paddles are arranged on the track belt.

Those of the paddles that are mutually adjacent in the direction of circulation of the track belt 3 preferably are of different form across a distal-end-periphery portion extending in the belt-width direction, and paddles having an identical form are preferably disposed repeatedly in the direction of circulation at an irregular interval. Specifically, each of the paddles is preferably grouped in a sequence A→C→D→B→D→C, and the sequence is repeated in the direction of circulation so that the paddles preferably repeat in a sequence A→C→D→B→D→C→A→C→D→B→D→C and so on, as shown in FIG. 16, for example.

When the snowmobile is parked, the lock button (not shown) provided to the handlebar 9 can be operated to switch on the tilt-locking mechanism 49. Specifically, when the rider operates the lock button, the motor 57 rotates in one direction, and the pinion gear 58 connected to the motor 57 rotates. The rotation of the pinion gear 58 moves the rack 59 engaging with the pinion gear 58, and therefore the rod 54, rearward with respect to the vehicle body. The rod 54 then enters each of the respective holes 40b, 41b on each of the front and rear plates 40, 41 of the swinging member 32. The rod 54 is thus moved to the locked position, thereby restricting the tilting of the vehicle body 1.

When the snowmobile is parked, the vehicle body 1 is biased towards assuming the neutral position by the tilt-restoring function of the torsion spring 44. In particular, the torsion spring 44 may be configured to have a large biasing force so that the vehicle body 1 assumes the neutral position. Therefore, the rod 54 is normally able to be moved smoothly into the locked position. However, in an instance where the vehicle body 1 does not return to the neutral position even in a state in which the snowmobile is parked, a spring-enabled rotational force absorption mechanism provided to the tilt-locking mechanism 49 absorbs the rotational force of the motor 57. Then, when the vehicle body 1 returns to the neutral position, a force stored in the spring moves the rod 54 to the locked position.

On mounting the snowmobile, the rider places, for example, one foot on the left foot-placement member 19, and mounts the snowmobile so as to straddle the seat 18. In such an instance, and as described above, the tilt-locking mechanism 49 prevents the vehicle body 1 from tilting, and the vehicle body 1 is therefore held at the neutral position even when the rider places a foot on the foot-placement member 19, allowing the rider to mount the snowmobile with ease.

Even when the tilt-locking mechanism 49 is in an unlocked state, the rider can place one foot on the foot-placement member 19 and mount the snowmobile so as to straddle the seat 18. Specifically, in an instance where the tilt-locking mechanism 49 is unlocked, the vehicle body 1 tilts leftwards when the rider places a foot on the foot-placement part 19. However, tilting of the vehicle body 1 is restricted to a predetermined angle by the tilt-stopper mechanism 48. The center of gravity of the vehicle remains within the region shown in FIG. 11 even during a state in which tilting is being restricted by the tilt-stopper mechanism 48. The rider is thereby able to mount the snowmobile safely.

Similar circumstances apply when the rider is dismounting the snowmobile, allowing the rider to dismount in a state in which the vehicle body is stable.

When the snowmobile is started, the lock button is operated and the tilt-locking mechanism 49 is unlocked, and then the engine is started. Alternatively, the engine is started and then the tilt-locking mechanism 49 is unlocked. When the tilt-locking mechanism 49 is operated so as to unlock, the motor 57 rotates in a direction that is opposite to that in an instance when the tilt-locking mechanism 49 is operated so as to lock, thereby moving the rod 54 to the frontward unlocked position via the pinion gear 58 and the rack 59. This makes it possible for the swinging member 32 to tilt freely relative to the vehicle body 1.

In such a state, operating an acceleration lever causes the track belt 3 to rotate and the vehicle to travel forward. Even if the vehicle body 1 is in a tilted state, leaving the handlebar 9 free to a certain extent causes the tilting of the vehicle body 1 to generate a steering force in the direction of the tilt of the vehicle body, and operating the acceleration lever to move the snowmobile forward starts to turn the snowmobile in the direction of the tilt of the vehicle body. When the snowmobile starts to turn, centrifugal force naturally turns the vehicle body upright, and the vehicle body returns to the substantially neutral position.

When the snowmobile is traveling in a straight line, the suspension mechanisms 7, 8 operate substantially similarly to those of the conventional art. The upper arm 29 and the lower arm 30, as well as the connecting member 28 and the skis 5, 6, move vertically relative to the vehicle body 1, and the shock absorber 31 expands and contracts, whereby any unevenness on the snow surface is absorbed, and the orientation of the vehicle body 1 is stabilized.

Next, for example, when turning left while the snowmobile is in motion, the rider tilts his or her body leftwards, thereby tilting the vehicle body 1 leftwards, as shown in FIG. 10. When the vehicle body 1 tilts leftwards, a force thus acts on a ground-contacting portion G on each of the left and right skis 5, 6 so as to push each of the left and right skis 5, 6 in a direction opposite the direction of the tilt of the vehicle body 1. Because the ground-contacting portion G of each of the skis 5, 6 on which the force acts is located rearward of the steering axis Z (see FIG. 13), each of the skis 5, 6 is steered in the direction of the tilt of the vehicle body 1. The snowmobile can accordingly be turned smoothly, at a high speed, and with a small turning radius. Even when the vehicle body 1 is tilting during such a turn, the suspension mechanisms 7, 8 function as normal.

Figure 17:
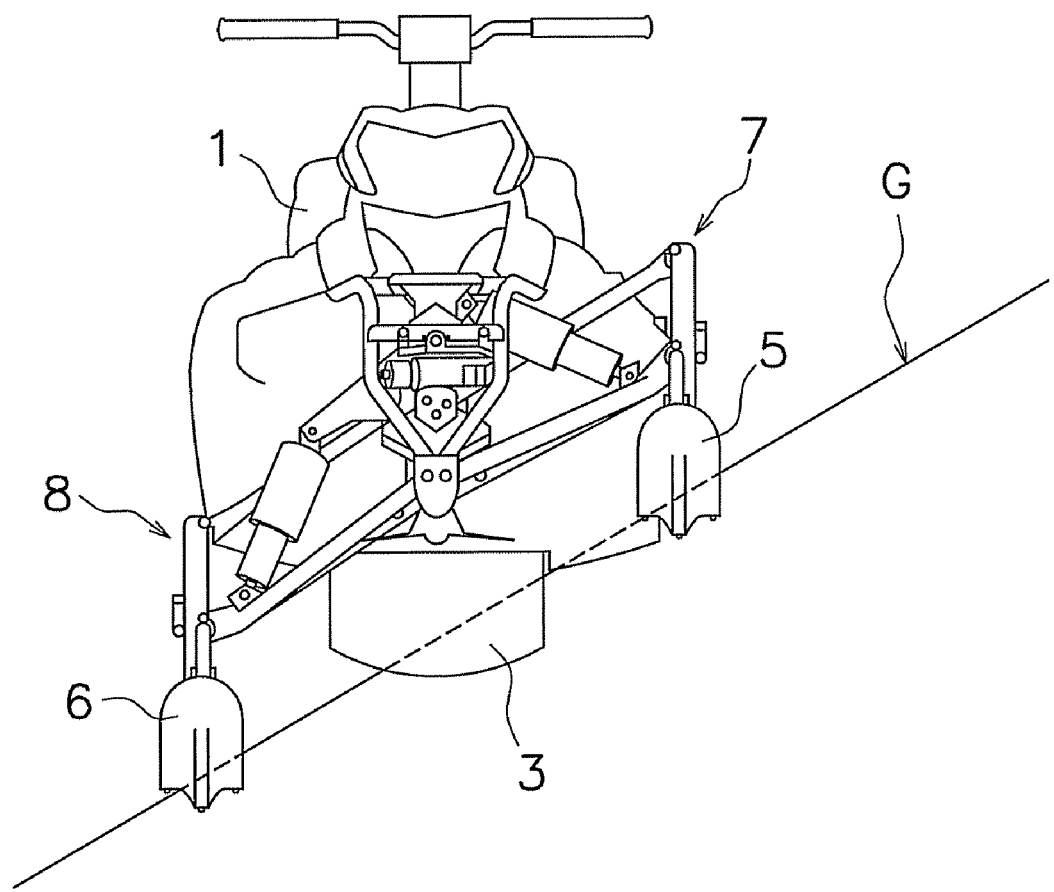
FIG. 17 is a front view showing the snowmobile traveling on a sloped surface.
Figure 18:
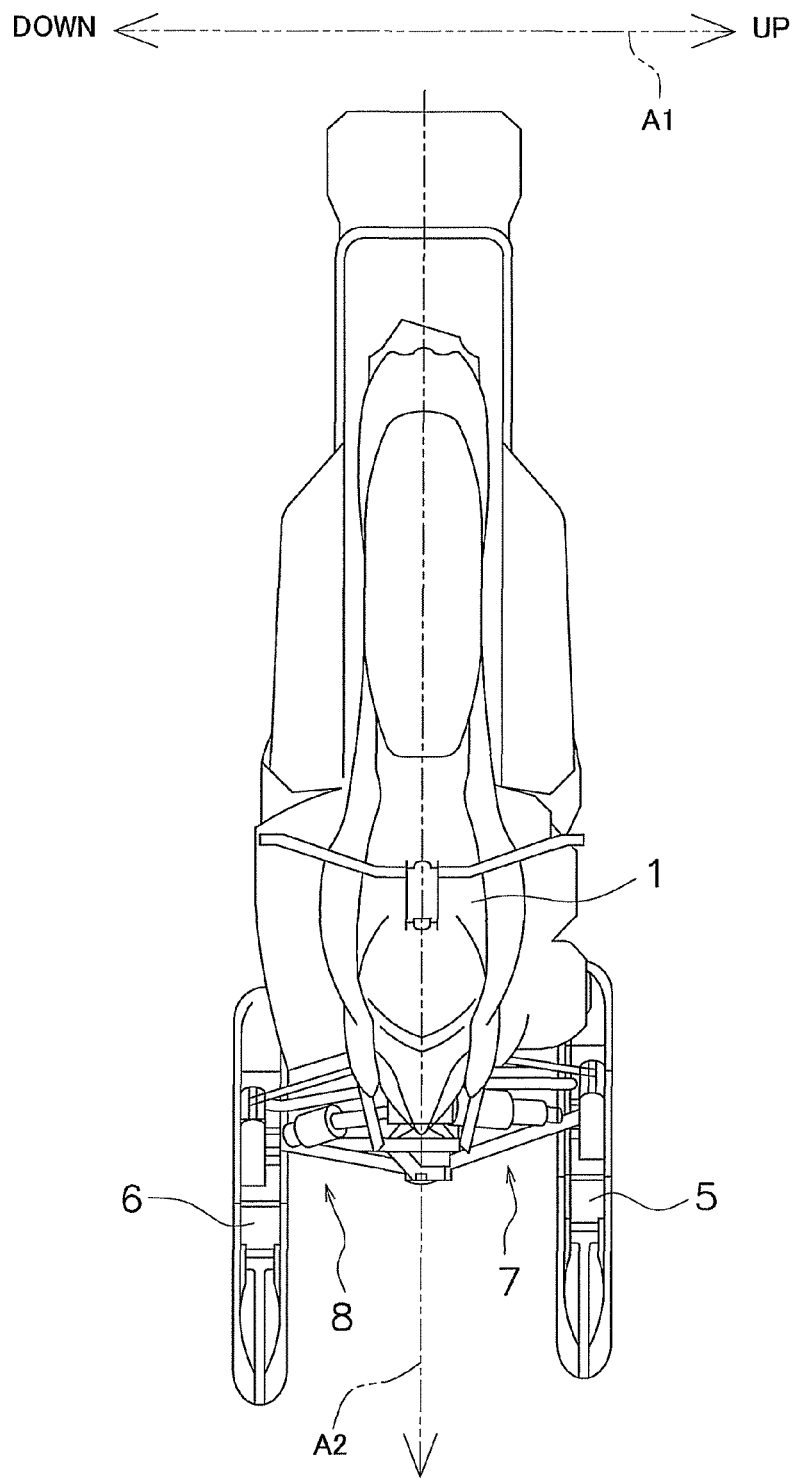
FIG. 18 is a top view showing the snowmobile traveling on a sloped surface.

When the snowmobile is diagonally descending a sloped surface covered by fresh snow, the suspension mechanisms 7, 8 tilt with the sloped surface but the vehicle body 1 remains in an upright orientation, as shown in FIGS. 17 and 18. Therefore, the rider may steer the snowmobile by pointing the skis 5, 6 to the desired direction of travel. The rider is not forced to adjust the driving force of the track belt 3 in order to balance the vehicle body 1. In FIG. 17, letter G indicates the sloped surface. In FIG. 18, arrow A1 shows the slope direction of the sloped surface. In FIG. 18, the right side is the uphill side, and the left side is the downhill side. Also, in FIG. 18, arrow A2 shows the direction in which the vehicle body 1 is traveling.

With the snowmobile, even when the vehicle body 1 tilts in either direction, the left and right skis 5, 6 both remain in contact with the snow surface. Also, each of the skis 5, 6 has the keel 5a in the center, and both left and right end portions are located higher than the center portion. Each of the skis 5, 6 thereby contacts the snow surface at the center portion and one of the end portions during turning, allowing the skis 5, 6 to firmly engage with the snow surface. Also, because the track belt 3 is preferably constructed to have a mound shape, even when the vehicle body 1 tilts, the ground-contacting point of the track belt 3 moves smoothly and only to a small extent. It thereby becomes possible to travel smoothly even during a turning maneuver or during travel on an uneven snow surface.

Although the vehicle body 1 and the swinging member 32 swing relative to each other when the vehicle body 1 tilts, in an instance where the tilt angle is large, the stopper block 50 provided to the swinging member 32 contacts the contact member 51 provided on the vehicle body 1. The swinging of the swinging member 32; i.e., the tilting of the vehicle body 1, is thereby restricted, and further tilting is prevented.

Also, according to the present preferred embodiment, the paddle 83 of the track belt preferably includes four patterns, the patterns preferably being repeated in the direction of circulation at an irregular interval, for example. Therefore, paddles having successively different patterns rake the snow surface and slippage is minimized, even in an instance where the condition of the snow surface is such that a paddle having a given pattern is unable to generate sufficient traction against the snow surface.

Characteristics of the present preferred embodiment are summarized as follows.

Even when travelling on a sloped surface covered by fresh snow, the rider can operate the steering so as to point the skis 5, 6 towards the direction of travel. Also, the vehicle body 1 can be balanced on a sloped surface with ease without the rider being forced to adjust the driving force of the track belt 3. AS a result, the snowmobile is able to travel smoothly on a sloped surface covered by fresh snow. Fuel efficiency can be thereby improved.

Moreover, the vehicle body 1 can be tilted with ease during a turning maneuver, and the left and right skis 5, 6 therefore self-steer into the direction of the turn, during which the left and right skis 5, 6 are both in contact with the snow surface. This makes it possible for the snowmobile to turn at a high speed and at a smaller turn radius than a conventional snowmobile, improving the turning performance.

In the snowmobile, because the paddle 83 of the track belt 3 is preferably constructed to have a mound shape, the ground-contacting portion where the paddle 83 and the snow surface are in contact does not move by an excessively large extent even when the vehicle body 1 tilts or when the snow surface is uneven. Therefore, the orientation of the vehicle body 1 is maintained with ease during travel even though the snowmobile is one in which the vehicle body is tiltable. Moreover, the tip periphery portion of the paddle 83 preferably has a curved form, thereby decreasing the scale of movement of the ground-contacting portion in the left-right direction, making it even easier to maintain orientation during travel.

A notch is preferably formed on the paddles 83 of the track belt 3. Therefore, adequate traction can be obtained even in such instances as where the snow surface is frozen; also, skidding of the track belt 3 can be minimized.

On the track belt 3, paddles that are mutually adjacent in the direction of circulation preferably differ in form, and paddles having an identical pattern are preferably repeated in the direction of circulation at an irregular interval, for example. As a result, the paddles are able to adequately rake the snow surface and stable traveling performance can be obtained even when the condition of the snow surface changes.

In an instance where the torsion spring 44 is provided so as to have a sufficient biasing force to maintain the swinging member 32 at the neutral position, the vehicle body 1 can be kept in an upright orientation when in a "free" state, in which no external force is acting thereon.

Although the vehicle body 1 of the snowmobile can be readily tilted during, for example, a turning maneuver, the suspension mechanisms 7, 8 will function as normal even in a state such as when the vehicle body 1 is tilting. In other words, the snowmobile is configured so that even when the vehicle body 1 is in a tilting state, the left and right skis 5, 6 remain capable of unrestricted vertical movement, absorbing any unevenness on the snow surface. As a result, riding comfort is not compromised despite the snowmobile being readily tiltable.

The upper arm 29 forming a portion or an element of the suspension mechanisms 7, 8 has a smaller inner opening angle than a regular double-wishbone-type upper arm, and a space for disposing other members is made available towards the front. As a result, the swinging member 32 arranged to make the vehicle body 1 tiltable can be disposed in a compact manner, and the total space occupied by each of the entire suspension mechanisms 7, 8 can be minimized despite the snowmobile being tiltable.

An extension of the steering axis passes further frontward of a ground-contacting portion of the ski (a point of contact between the ski and the suspension mechanism), and the ski thereby self-steers to the direction of the turn when the vehicle body 1 is tilted during a turning maneuver. As a result, it becomes possible for the snowmobile to turn at a smaller turning radius and at a high speed.

The connecting member 28 is preferably arranged so as to include three C-shaped cross-sectional surfaces, and each of the mounting shafts 37b, 28b of the respective spherical bearings 37, 38 arranged to support each of the upper arm 29 and lower arm 30 respectively is preferably disposed along the longitudinal direction of the vehicle on the connecting member 28. As a result, there is no need to account for interference between each of the arms 29, 30 and the connecting member 28, and a large suspension stroke can be obtained. It is thereby possible to obtain a large tilting angle in a vehicle whose body 1 is tiltable, as with the present preferred embodiment.

For a reason similar to that described in the preceding paragraph, the connecting member 28 can be used as a member defining a portion or element of the suspension mechanism 7, 8 and the steering mechanism 10. A simple configuration is thus obtained.

The snowmobile allows the rider to tilt the vehicle body with ease as described above, and can be turned in a similar manner to a 2-wheeled vehicle.

In a typical snowmobile, component parts such as a fuel tank and an engine are disposed frontward of a seat. As a result, it is not possible to mount the snowmobile in a similar manner to when mounting some types of scooters by placing a foot on a flat foot-placing section located frontward of the seat; rather, the rider must step over the seat when mounting. However, a snowmobile has a relatively large vehicle width unlike a typical motorcycle, and it is therefore difficult to step over the seat with one leg while keeping the opposing foot on the snow surface. As a result, a rider normally mounts the snowmobile by, for example, placing the left foot on the left foot-placement member and swinging their right leg over the seat. However, in an instance where the vehicle is made to be tiltable as described above, the vehicle tilts when a foot is placed on one of the foot-placement members, and mounting the snowmobile in a stable orientation becomes difficult.

In contrast, in a snowmobile according to the present preferred embodiment, the tilt-stopper mechanism 48 or the tilt-locking mechanism 49 restricts the tilting angle or prevents tilting. A center of gravity of the vehicle is therefore contained within a region formed by linking a rear end B (B') of the ground-contacting portion of the track belt 3 with the planar projection of respective points of connection Fl, Fr (Fl', Fr') between each of the two skis 5, 6 and each of the suspension mechanisms, even when an external force acts on the vehicle body. As a result, the snowmobile maintains a stable orientation, and the rider is able to mount or dismount the snowmobile with ease, even when the rider mounts or dismounts the snowmobile by placing one foot on a foot-placement member and swings the opposing leg over the seat.

Since the suspension mechanisms 7, 8 continue to function as normal even in a state in which the tilting of the vehicle is at a maximum as a result of the tilt-stopper mechanism 48, riding comfort is not compromised despite the vehicle body 1 being tiltable, as described earlier.

The tilt-locking mechanism 49 operates by locking the swinging of the swinging member 32, which is a component member of the suspension mechanisms 7, 8. A simple configuration is thus obtained.

Since the paddle 83 of the track belt 3 is preferably constructed to have a mound shape, tilting the vehicle body 1 causes a ground-contacting portion, where the paddle and the snow surface are in contact, to move in response to the tilting. As a result, there is less disturbance in the relative positional relationship between the center of gravity of the vehicle and the region formed by linking the rear end of the ground-contacting portion of the track belt 3 with planar projection points of two points of connection between each of the two skis and the suspension mechanism, and the orientation of the vehicle can be further stabilized.

Figure 19:
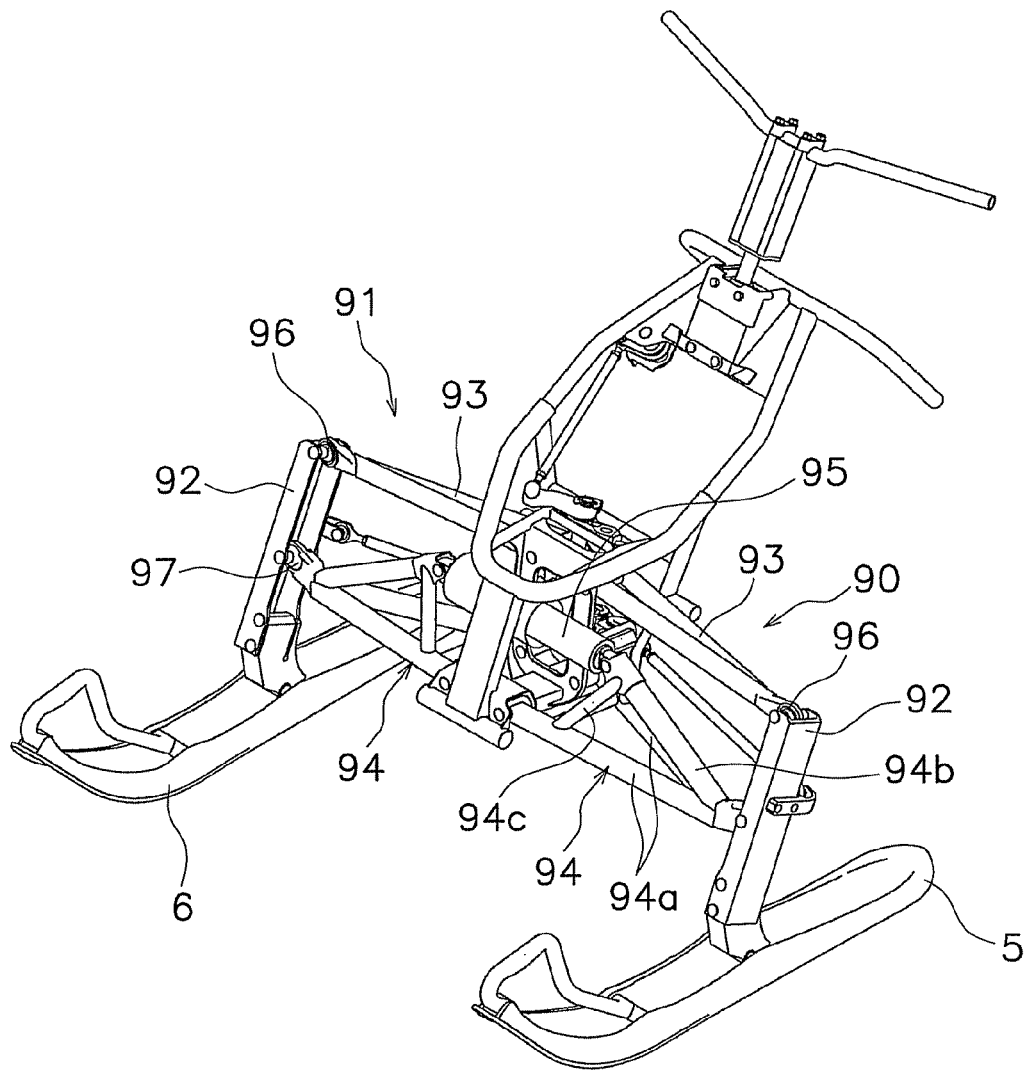
FIG. 19 is a drawing showing another preferred embodiment of a suspension mechanism.

FIG. 19 shows another preferred embodiment of the suspension mechanism. As with the previous preferred embodiment, left and right suspension mechanisms 90, 91 according to the present preferred embodiment are preferably of a double-wishbone-type, each preferably including a connecting member 92, an upper arm 93, and a lower arm 94. The suspension mechanisms 90, 91 include a shock absorber 95 connected so as to move the left and right lower arms in a corresponding manner.

The connecting member 92 and the upper arm 93 have the same configurations as those of the connecting member 28 and the upper arm 29 in the previous preferred embodiment, respectively. Again, as with the previous preferred embodiment, each of the arms 93, 94 is supported by the connecting member 92 via a spherical bearing 96, 97.

Each of the left and right lower arms 94 includes a pair of first members 94a disposed on a lower side, a second member 94b, and a pair of third members 94c. The first member 94a is preferably a V-shaped member whose open side is closer to the vehicle body 1 side (inner side) and whose joined side is further away from the vehicle body 1 (outside). An inner end portion of the first member 94a is attached on the frame of the vehicle body 1 so as to be capable of pivoting about an axis in the longitudinal direction of the vehicle body. An outer end portion of the first member 94a is supported by a portion substantially central in the vertical direction of the connecting member 92 via a spherical bearing 97. An outer end portion of the second member 94b is fixed to an outer end portion of the first member 94a, and the second member 94b extends diagonally upwards from the outer end portion towards the vehicle body 1. The third member 94c is arranged so as to connect respective inside portions of the pair of first members 94a to an inner end portion of the second member 94b.

Each end of the shock absorber 95 is attached to an inner end portion of each of the two second arms 94b so as to be capable of pivoting about an axis in the longitudinal direction of the vehicle body, each of which second arms 94b defining a portion of the left and right lower arms 94, respectively. The shock absorber 95 is not supported by the vehicle body 1, and is capable of moving freely relative to the vehicle body 1.

Such a suspension mechanism enables the vehicle body 1 to be readily tilted, as with the previous preferred embodiment. Also, in the suspension mechanism according to the present preferred embodiment, only one shock absorber is required in order to absorb shock and to associate the left and right suspension mechanisms 90, 91, resulting in a configuration that is simpler than that of the previous preferred embodiment.

The form, sequence, and similar attributes of the paddle 83 of the track belt 3 are not limited to those according to the previous preferred embodiments, and a variety of configurations may be adopted.

In the previous preferred embodiments, the paddle is preferably construction of a plurality of protrusions arranged in a row along the belt-width direction. However, the shape of the paddle is not limited to such forms. The paddle may be shaped by a single protrusion having a plurality of notches $83c_{11}$ disposed on an outer periphery thereof. In such an instance, each paddle may be varied in form so that each successive paddle has a different outline profile of a section from the center portion in the belt-width direction to each of the two end portions.

In the previous preferred embodiments, a double-wishbone-type suspension mechanism including a lower arm and an upper arm was used as an example to describe a suspension mechanism used in the present invention. However, the suspension mechanism is not limited to this configuration. Strut-type, multi-link-type, and a variety of other types of suspensions may be used in the present invention.

In the previous preferred embodiments, the tilt-locking mechanism operates preferably by preventing the swinging of the swinging member. However, the tilt-locking mechanism is not limited to this configuration. Instead, for example, a rotary damper may be provided to the swinging axis section of the swinging member in the previous preferred embodiment, and the operation of the rotary damper may be controlled. The dampening force of the rotary damper on the tilting movement of the vehicle may be varied according to a parameter indicating the state of the vehicle. Examples of a parameter indicating the state of the vehicle include the vehicle speed, engine speed, throttle angle, rate of change of throttle angle, roll angle, roll rate, yaw rate, pitch angle, pitch rate, steering angle, and braking state.

Instead of the rotary damper, the tilt-locking mechanism may have an MR damper capable of controlling damping force by electrically controlling a magnetorheological fluid, and controlling the damping force according to the vehicle speed. Alternatively, a stroke-type damper may be provided.

In the previous preferred embodiment, the tilt-stopper mechanism 48 preferably includes the holes 40b, 41b formed on the swinging member 32 and a rod 54 provided on the vehicle body 1 so as to be capable of advancing and retracting. Alternatively, a hole may be formed on the vehicle body 1 and a rod provided to the swinging member 32.

Figure 20:
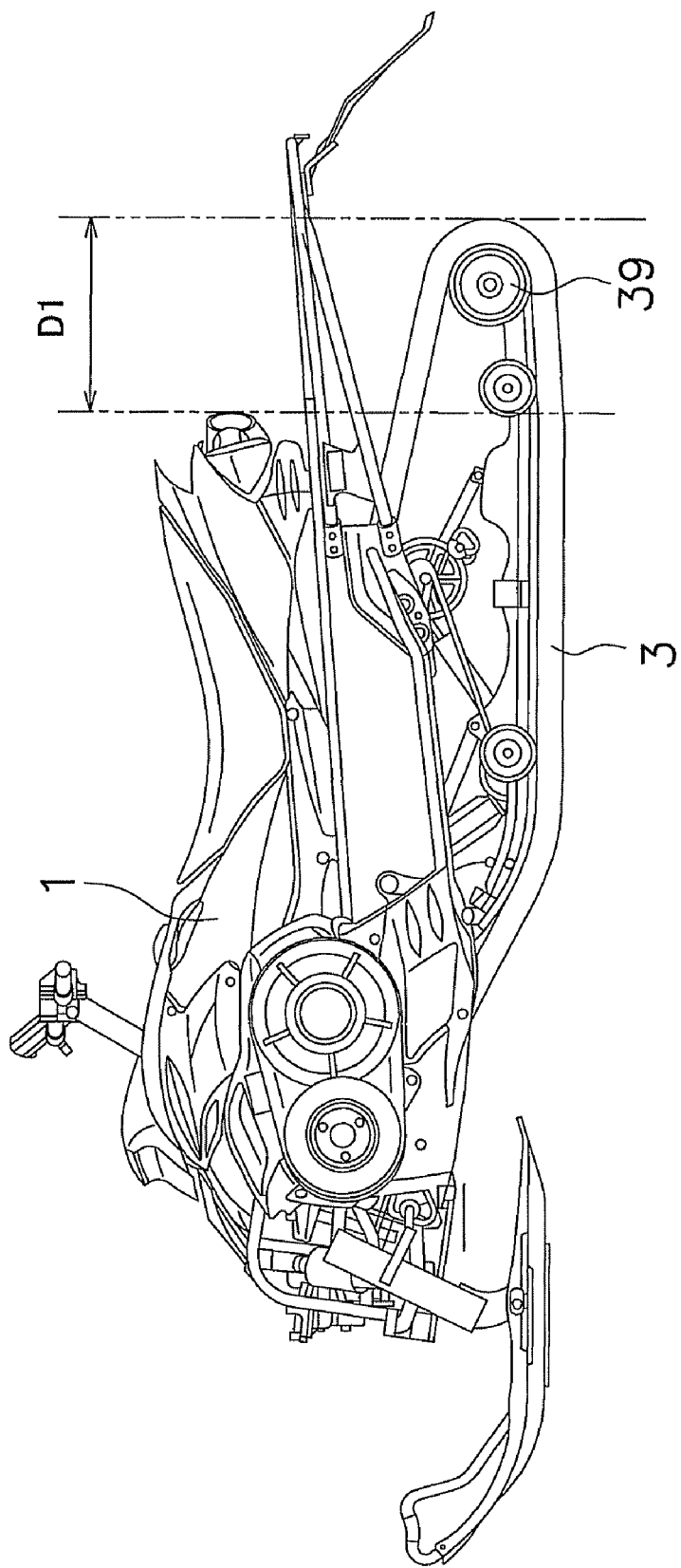
FIG. 20 is a drawing showing another preferred embodiment of a snowmobile.
Figure 21:
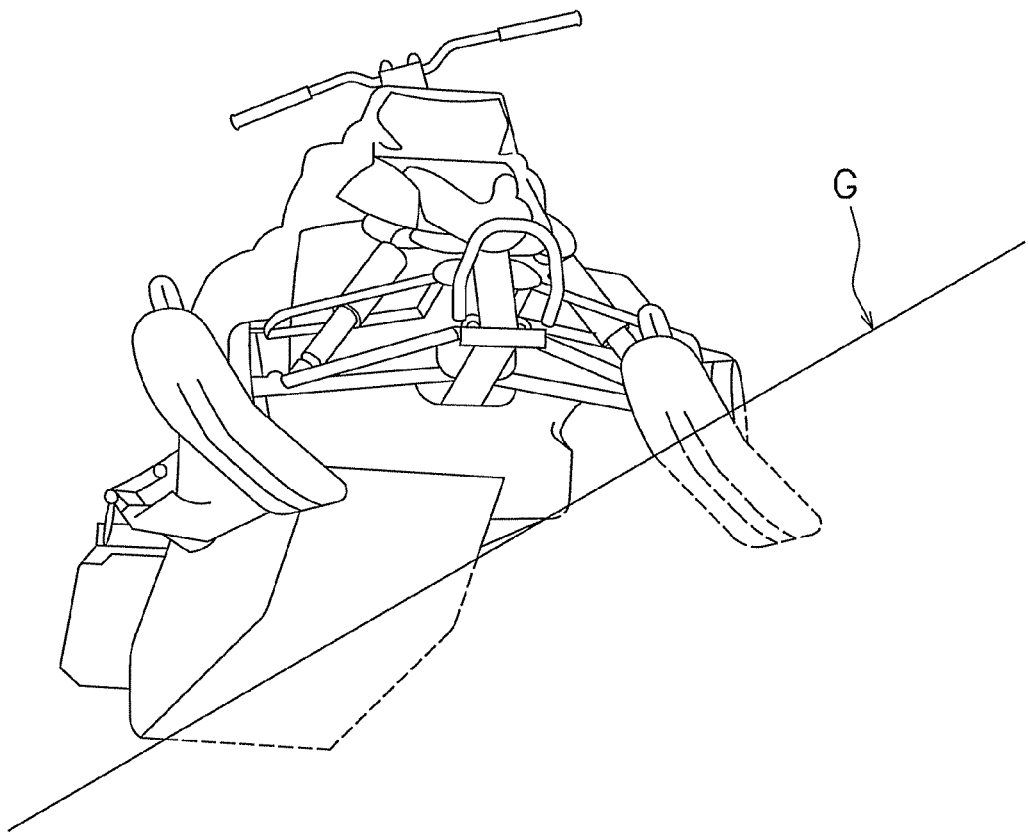
FIG. 21 is a front view showing a snowmobile according to the related art, travelling on a sloped surface.
Figure 22:
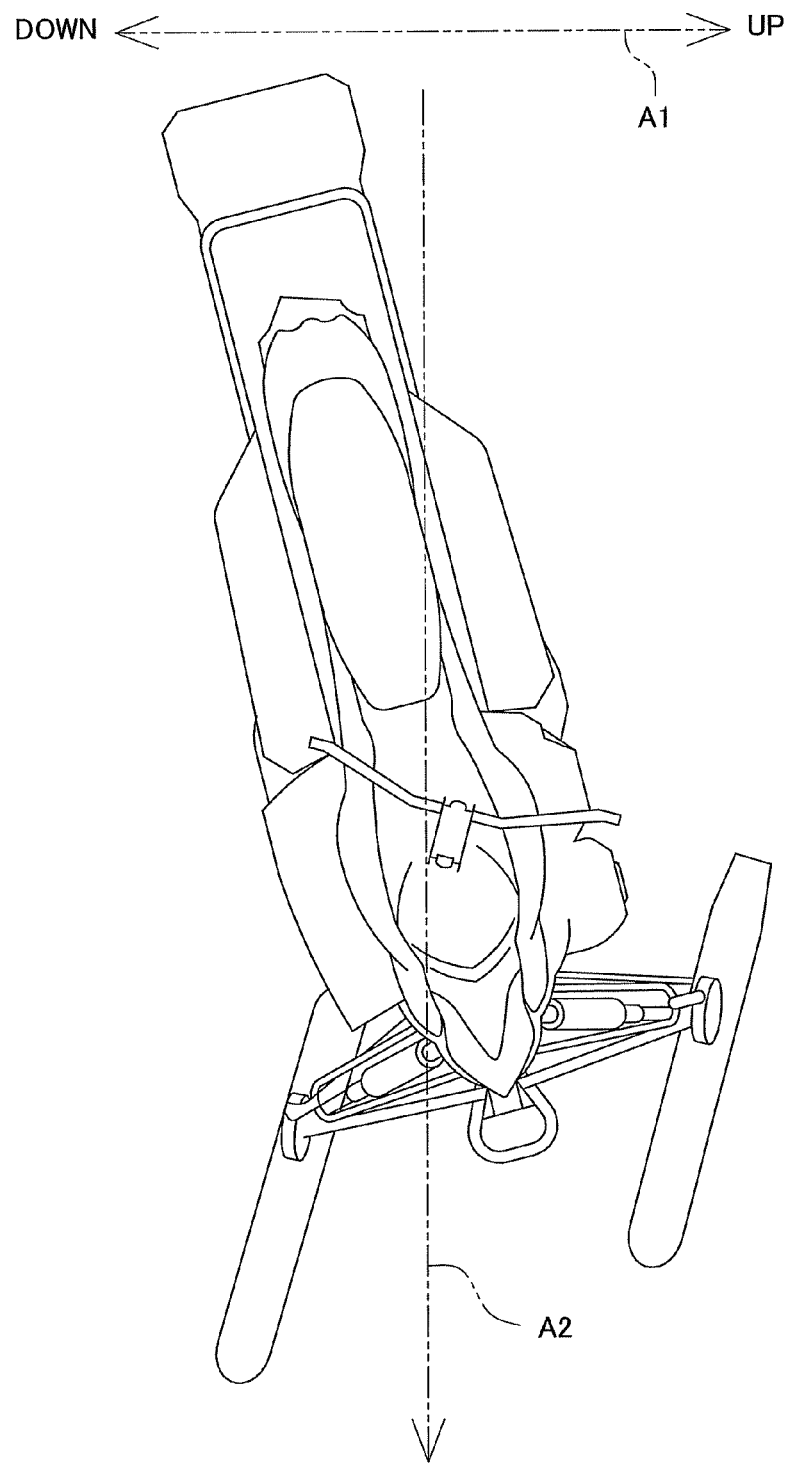
FIG. 22 is a top view showing a snowmobile according to the related art, travelling on a sloped surface.

FIG. 20 shows yet another preferred embodiment of a snowmobile. In a snowmobile according to the present preferred embodiment, a track belt 3 extends further rearward than the track belt 3 in a snowmobile according to the previous preferred embodiment. For example, in the snowmobile according to the present preferred embodiment, a distance D1 between a rear end of the track belt 3 and a rear end of a vehicle body 1 is greater than the diameter of a driven disc 39 arranged to support a rear portion of the track belt 3. Thus configuring the track belt 3 so as to extend rearward of the vehicle body 1 by a considerable distance increases the likelihood of the rear portion of the track belt 3 contacting the snow surface even on the surface covered by fresh snow. Travel on the surface covered by fresh snow is thereby facilitated by an even greater extent.

In the previous preferred embodiment, a torsion spring 44 is preferably provided the suspension mechanisms 7, 8. However, the torsion spring 44 may be omitted, because when a snowmobile is subject to a forward propulsion force when the steering is in an engaged state, the vehicle may be subject to a force so as to return the vehicle towards a non-tilting state, depending on snow quality.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A snowmobile comprising:
   a vehicle body including a seat located at an upper portion of the vehicle body;
   a track belt located at a lower portion of the vehicle body;
   a driving source arranged to drive the track belt;
   a left-and-right pair of skis located on a front section of the vehicle body;
   a suspension mechanism arranged to support the pair of skis so as to move in a vertical direction with respect to the vehicle body and such that the pair of skis move in opposite directions with respect to each other; and a steering mechanism arranged to steer the pair of skis; wherein each of the pair of skis is arranged to pivot around a steering axis, an extension of the steering axis passing further frontward of a point of connection between each of the pair of skis and the suspension mechanism;

the suspension mechanism includes:
a pair of connecting members to which each of the pair of skis is respectively connected;
a pair of arm members, one end of each of which is connected to the vehicle body, the pair of arm members supporting each of the pair of skis respectively so as to allow movement in the vertical direction with respect to the vehicle body; and
a spherical bearing for the pair of arm members is arranged to support the other end of each of the pair of arm members against each of the pair of connecting members, respectively; and the spherical bearing for the pair of arm members includes a mounting shaft mounted on the pair of connecting members, the mounting shaft being disposed substantially along a longitudinal direction of the vehicle body.

2. The snowmobile according to claim 1, wherein the suspension mechanism includes:
an impact-absorbing mechanism connected to each of the pair of arm members and arranged to absorb, irrespective of a tilt of the vehicle body, an impact acting on the pair of skis.

3. The snowmobile according to claim 2, wherein the impact-absorbing mechanism includes:
a swinging member provided on the vehicle body and arranged to swing about an axial core extending in the longitudinal direction of the vehicle body; and
a pair of impact-absorbing members, one end of each of the impact-absorbing members being connected to each of the pair of arm members, respectively, and the other end of each of the impact-absorbing members being connected to the swinging member.

4. The snowmobile according to claim 1, wherein a cross-section of the track belt in a direction perpendicular or substantially perpendicular to a direction of belt circulation is such that a center portion of a ground-contacting surface of the track belt is convex.

5. The snowmobile according to claim 4, wherein:
the track belt includes an annular belt base portion;
a plurality of paddles are provided on the belt base portion so as to protrude outwards and extend in a belt-width direction, the paddles being arranged at a predetermined interval in the direction of belt circulation; and
a distal end portion of the paddles extending in the belt-width direction includes a curved portion.

6. The snowmobile according to claim 4, wherein
the track belt includes an annular base portion;
a plurality of paddles are provided on the belt base portion so as to protrude outwards and extend in the belt-width direction, the paddles being arranged at a predetermined interval in the direction of belt circulation; and
a notch is provided on a distal end portion of the paddle extending in the belt-width direction.

7. The snowmobile according to claim 4, wherein:
the track belt includes an annular base portion;
a plurality of paddles are provided on the belt base portion so as to protrude outwards and extend in the belt-width direction, the paddles being arranged at a predetermined interval in the direction of belt circulation; and
mutually adjacent pairs of the paddles in the direction of circulation are of a different form from each other.

8. The snowmobile according to claim 5, wherein each of the paddles is of a form that differs across a distal-end-periphery portion extending in the belt-width direction, and paddles having an identical form are arranged repeatedly in the direction of circulation at an irregular interval.

9. The snowmobile according to claim 1, further comprising a swing axis provided at a point of connection between each of the pair of skis and the suspension mechanism, the swing axis extending in the vehicle-width direction, wherein each of the pair of skis is arranged to swing about the swing axis.

10. The snowmobile according to claim 1, wherein the steering mechanism includes:
a tie rod arranged to turn the pair of skis in response to a handlebar being operated; and
a spherical bearing for the tie rod being arranged to support a distal end of the tie rod on each of the pair of connecting members.

11. The snowmobile according to claim 1, further comprising a self-supporting device arranged to contain a projection point of a center of gravity of the vehicle within a region defined by linking a rear end of a ground-contacting portion of the track belt with projection points of two points of connection between each of the pair of skis and the suspension mechanism; wherein
the vehicle body includes left and right foot-placement members on the lower portion, the left and right foot-placement members being separated by a structural member located frontward of the seat.

12. The snowmobile according to claim 11, further comprising a swing axis provided at the two points of connection between each of the pair of skis and the suspension mechanism and extending in a vehicle-width direction, wherein each of the pair of skis is arranged to swing about the swing axis.

13. The snowmobile according to claim 11, wherein the self-supporting device includes a tilt-stopper mechanism arranged to restrict tilting of the vehicle body caused by the suspension mechanism to within a predetermined angle.

14. The snowmobile according to claim 13, wherein the suspension mechanism is arranged to allow the pair of skis to move vertically even in a state in which the tilt-stopper mechanism has restricted the tilting of the vehicle body.

15. The snowmobile according to claim 13, wherein the suspension mechanism includes:
a swinging member provided on the vehicle body and arranged to swing about an axial core extending in the longitudinal direction of the vehicle body;
a pair of impact-absorbing members, one end of each of the impact-absorbing members being connected to each of the pair of arm members, respectively; and the other end of each of the impact-absorbing members being connected to the swinging member; and
the tilt-stopper mechanism is arranged to restrict the swinging of the swinging member relative to the vehicle body.

16. The snowmobile according to claim 11, wherein the self-supporting device includes a tilt-locking mechanism arranged to lock the tilting of the vehicle as caused by the suspension mechanism.

17. The snowmobile according to claim 16, wherein the suspension mechanism includes:
a swinging member provided on the vehicle body and being arranged to swing about an axial core extending in the longitudinal direction of the vehicle body;
a pair of impact-absorbing members, one end of each of the impact-absorbing members being connected to each of the pair of arm members, respectively; and the other end of each of the impact-absorbing members being connected to the swinging member; and the tilt-locking mechanism is arranged to lock the swinging of the swinging member relative to the vehicle body.

18. The snowmobile according to claim 11, wherein a cross-section of the track belt in a direction perpendicular or substantially perpendicular to a direction of belt circulation is such that a center portion of a ground-contacting surface of the track belt is convex.

19. The snowmobile according to claim 1, wherein the suspension mechanism is arranged to support the pair of skis such that one of the pair of skis moves downward relative to the vehicle body when the other of the pair skis moves upward relative to the vehicle body.

20. A snowmobile comprising:
a vehicle body including a seat located at an upper portion of the vehicle body;
a track belt located at a lower portion of the vehicle body;
a driving source arranged to drive the track belt;
a left-and-right pair of skis located on a front section of the vehicle body;
a suspension mechanism arranged to support the pair of skis so as to move in a vertical direction with respect to the vehicle body and such that the pair of skis move in opposite directions with respect to each other; and
a steering mechanism arranged to steer the pair of skis; wherein
each of the pair of skis is arranged to pivot around a steering axis, an extension of the steering axis passing further frontward of a point of connection between each of the pair of skis and the suspension mechanism;
the steering mechanism includes:
a tie rod arranged to turn the pair of skis in response to a handlebar being operated; and
a spherical bearing for the tie rod being arranged to support a distal end of the tie rod on each of a pair of connecting members to which each of the pair of skis is respectively connected; and
the spherical bearing for the tie rod includes a mounting shaft mounted on the pair of connecting members, the mounting shaft being disposed to extend substantially along a longitudinal direction of the vehicle body.

21. A snowmobile comprising:
a vehicle body including a seat located at an upper portion of the vehicle body;
a track belt located at a lower portion of the vehicle body;
a driving source arranged to drive the track belt;
a left-and-right pair of skis located on a front section of the vehicle body;
a suspension mechanism arranged to support the pair of skis so as to move in a vertical direction with respect to the vehicle body and such that the pair of skis move in opposite directions with respect to each other; and
a steering mechanism arranged to steer the pair of skis; wherein
each of the pair of skis is arranged to pivot around a steering axis, an extension of the steering axis passing further frontward of a point of connection between each of the pair of skis and the suspension mechanism;
the suspension mechanism includes:
a pair of connecting members to which each of the pair of skis is respectively connected;
a pair of arm members, one end of each of which is connected to the vehicle body, the pair of arm members supporting each of the pair of skis respectively so as to allow movement in the vertical direction with respect to the vehicle body; and
a spherical bearing for the pair of arm members is arranged to support the other end of each of the pair of arm members against each of the pair of connecting members, respectively; and
each of the pair of connecting members has a C-shape in cross-section, including a first surface disposed outwardly in a vehicle-width direction and perpendicularly or substantially perpendicular with respect to the vehicle-width direction, and a second and a third surface extending towards the vehicle body from each of respective front and rear edges of the first surface.

22. The snowmobile according to claim 21, wherein the spherical bearing for the pair of arm members includes a mounting shaft supported by the second and third surfaces of the pair of connecting members.

23. A snowmobile comprising:
a vehicle body including a seat located at an upper portion of the vehicle body;
a track belt located at a lower portion of the vehicle body;
a driving source arranged to drive the track belt;
a left-and-right pair of skis located on a front section of the vehicle body;
a suspension mechanism arranged to support the pair of skis so as to move in a vertical direction with respect to the vehicle body and such that the pair of skis move in opposite directions with respect to each other;
a steering mechanism arranged to steer the pair of skis; and
a self-supporting device arranged to contain a projection point of a center of gravity of the vehicle within a region defined by linking a rear end of a ground-contacting portion of the track belt with projection points of two points of connection between each of the pair of skis and the suspension mechanism; wherein
the vehicle body includes left and right foot-placement members on the lower portion, the left and right foot-placement members being separated by a structural member located frontward of the seat;
the self-supporting device includes a tilt-stopper mechanism arranged to restrict tilting of the vehicle body caused by the suspension mechanism to within a predetermined angle;
the suspension mechanism includes:
a pair of connecting members to which each of the pair of skis is respectively connected;
a pair of arm members, one end of each of the pair of arm members is connected to the respective connecting member and the other end of each of the pair of arm members is connected to the vehicle body, the pair of arm members supporting each of the pair of skis respectively so as to allow movement in the vertical direction with respect to the vehicle body;
a swinging member provided on the vehicle body and arranged to swing about an axial core extending in a longitudinal direction of the vehicle body;
a pair of impact-absorbing members, one end of each of the impact-absorbing members being connected to each of the pair of arm members, respectively; and the other end of each of the impact-absorbing members being connected to the swinging member; and
the tilt-stopper mechanism is arranged to restrict the swinging of the swinging member relative to the vehicle body; and
the tilt-stopper mechanism includes:
a hole provided on one of either the swinging member or the vehicle body;

a rod provided on the other of either the swinging member or the vehicle body so as to be capable of advancing and retracting, the rod assuming a locked position in which the rod has entered the hole or an unlocked position in which the rod has withdrawn from the hole; and a rod driving section arranged to drive the rod between the locked position and the unlocked position.

24. A snowmobile comprising:

a vehicle body including a seat located at an upper portion of the vehicle body;

a track belt located at a lower portion of the vehicle body;

a driving source arranged to drive the track belt;

a left-and-right pair of skis located on a front section of the vehicle body;

a suspension mechanism arranged to support the pair of skis so as to move in a vertical direction with respect to the vehicle body and such that the pair of skis move in opposite directions with respect to each other;

a steering mechanism arranged to steer the pair of skis; and a self-supporting device arranged to contain a projection point of a center of gravity of the vehicle within a region defined by linking a rear end of a ground-contacting portion of the track belt with projection points of two points of connection between each of the pair of skis and the suspension mechanism; wherein the vehicle body includes left and right foot-placement members on the lower portion, the left and right foot-placement members being separated by a structural member located frontward of the seat;

the self-supporting device includes a tilt-locking mechanism arranged to lock the tilting of the vehicle as caused by the suspension mechanism;

the suspension mechanism includes:

a pair of connecting members to which each of the pair of skis is respectively connected;

a pair of arm members, one end of each of the pair arm members being connected to the respective connecting member and the other end of each of the pair of arm members being connected to the vehicle body, the pair of arm members being arranged to support each of the pair of skis respectively so as to allow movement in the vertical direction with respect to the vehicle body;

a swinging member provided on the vehicle body and being arranged to swing about an axial core extending in the longitudinal direction of the vehicle body;

a pair of impact-absorbing members, one end of each of the impact-absorbing members being connected to each of the pair of arm members, respectively; and the other end of each of the impact-absorbing members being connected to the swinging member;

the tilt-locking mechanism is arranged to lock the swinging of the swinging member relative to the vehicle body; and the tilt-locking mechanism includes:

a hole provided on one of either the swinging member or the vehicle body;

a rod provided on the other of either the swinging member or the vehicle body so as to be capable of advancing and retracting, the rod assuming a locked position in which the rod has entered the hole or an unlocked position in which the rod has withdrawn from the hole; and a rod driving section arranged to drive the rod between the locked position and the unlocked position.

25. A snowmobile comprising:

a vehicle body including a seat located at an upper portion of the vehicle body;

a track belt located at a lower portion of the vehicle body;

a driving source arranged to drive the track belt;

a left-and-right pair of skis located on a front section of the vehicle body;

a suspension mechanism arranged to support the pair of skis so as to move in a vertical direction with respect to the vehicle body and such that the pair of skis move in opposite directions with respect to each other;

a steering mechanism arranged to steer the pair of skis; and a self-supporting device arranged to contain a projection point of a center of gravity of the vehicle within a region defined by linking a rear end of a ground-contacting portion of the track belt with projection points of two points of connection between each of the pair of skis and the suspension mechanism; wherein the vehicle body includes left and right foot-placement members on the lower portion, the left and right foot-placement members being separated by a structural member located frontward of the seat;

the self-supporting device includes a tilt-locking mechanism arranged to lock the tilting of the vehicle as caused by the suspension mechanism;

the suspension mechanism includes:

a pair of connecting members to which each of the pair of skis is respectively connected;

a pair of arm members, one end of each of the pair arm members being connected to the respective connecting member and the other end of each of the pair of arm members being connected to the vehicle body, the pair of arm members being arranged to support each of the pair of skis respectively so as to allow movement in the vertical direction with respect to the vehicle body;

a swinging member provided on the vehicle body and being arranged to swing about an axial core extending in the longitudinal direction of the vehicle body;

a pair of impact-absorbing members, one end of each of the impact-absorbing members being connected to each of the pair of arm members, respectively; and the other end of each of the impact-absorbing members being connected to the swinging member;

the tilt-locking mechanism is arranged to lock the swinging of the swinging member relative to the vehicle body; and the suspension mechanism includes a damper device arranged to apply resistance to the swinging movement of the swinging member relative to the vehicle body, and the tilt-locking mechanism is arranged to control a resistance force of the damper device.

* * * * *